United States Patent
Oura

(10) Patent No.: US 6,732,297 B2
(45) Date of Patent: May 4, 2004

(54) PIPELINE TESTING METHOD, PIPELINE TESTING SYSTEM, PIPELINE TEST INSTRUCTION GENERATION METHOD AND STORAGE METHOD

(75) Inventor: Hironobu Oura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 09/725,881

(22) Filed: Nov. 30, 2000

(65) Prior Publication Data

US 2001/0014957 A1 Aug. 16, 2001

(30) Foreign Application Priority Data

Feb. 8, 2000 (JP) ........................................ 2000-030993

(51) Int. Cl.[7] .............................................. G06F 11/00
(52) U.S. Cl. .............................. 714/33; 714/16; 714/35; 714/32; 703/22
(58) Field of Search .............................. 714/33, 13, 16, 714/30, 35, 34, 47, 38, 48; 712/227, 220, 23, 228, 208; 703/22, 17, 14

(56) References Cited

U.S. PATENT DOCUMENTS 5,673,425 A  9/1997  Iwashita ..................... 712/227

6,212,493 B1 * 4/2001 Huggins et al. .............. 703/22

FOREIGN PATENT DOCUMENTS

JP  8-287123   11/1996
JP  10-326188  12/1998

OTHER PUBLICATIONS

"Microsoft Computer Dictionary." Microsoft Press. Fifth Edition. 2002. P. 406.*

* cited by examiner

Primary Examiner—Nadeem Iqbal
Assistant Examiner—Christopher Euripidou
(74) Attorney, Agent, or Firm—Staas & Halsey LLP

(57) ABSTRACT

This invention relates to a method of generating a test-instruction string to test the pipeline mechanism of a processor, which automatically generates from randomly generated instructions an instruction string which causes a pipeline interlock. This invention comprises a table for notifying the subsequent instruction of the status of resource usage of the leading instruction and, by generating the resources used, by the subsequent instruction according to the status of resource usage of the table automatically generates a subsequent instruction that interferes with the leading instruction.

18 Claims, 21 Drawing Sheets

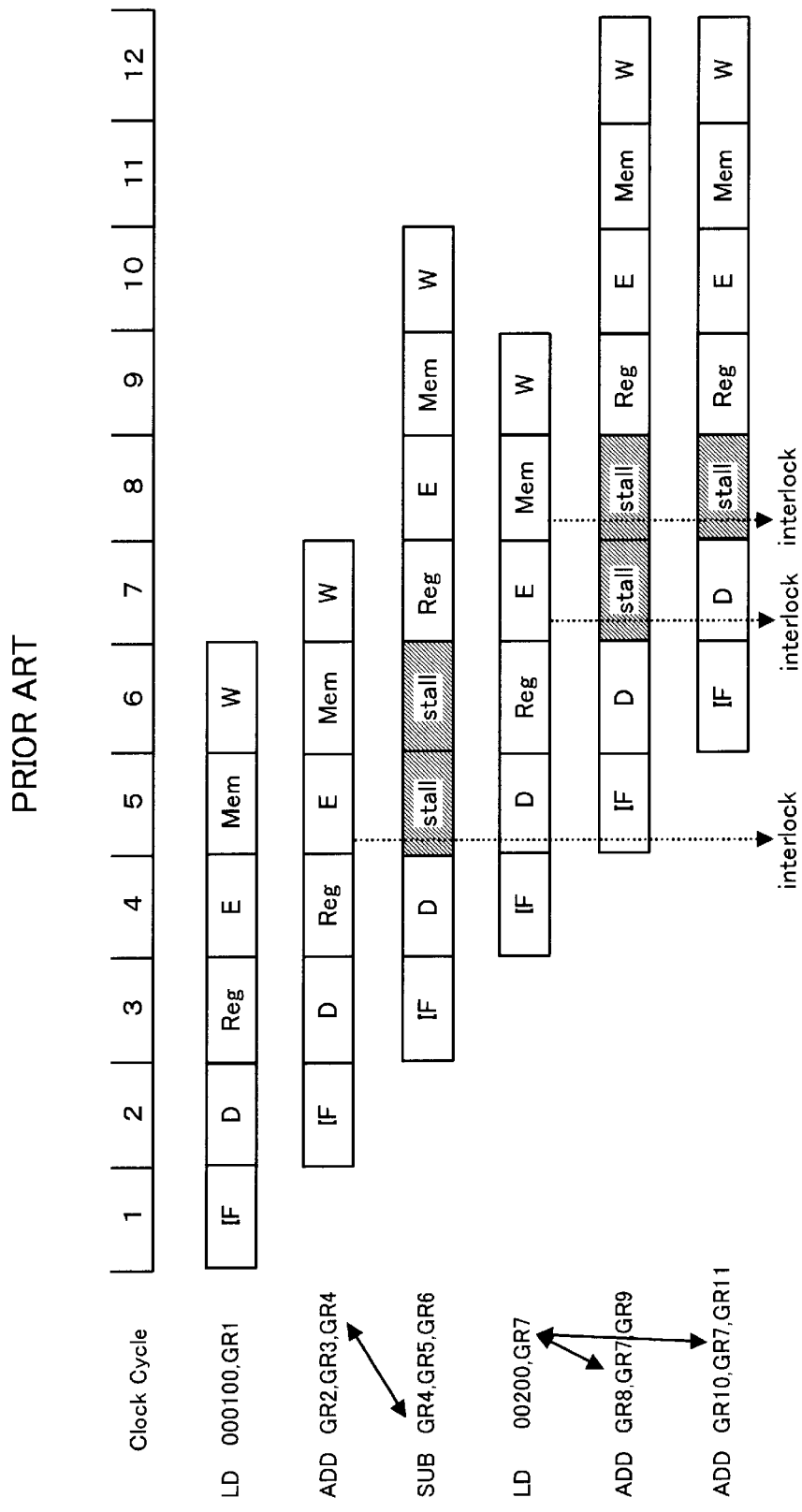

PIPELINE TESTING METHOD, PIPELINE TESTING SYSTEM, PIPELINE TEST INSTRUCTION GENERATION METHOD AND STORAGE METHOD

BACKGROUND OF THE INVENTION

1. Field of the Invention

This invention relates to a testing method, test system, test instruction generation method and storage medium for an information processing device (processor) having a pipeline mechanism, and more particularly to a testing method, test system, test instruction generation method and storage medium that automatically generate leading instructions and subsequent instructions that interfere with resources.

2. Description of the Related Art

In recent years, information processing devices, and particularly, processors, have been making rapid advances. Processors with a fast processing speed generally use a pipeline mechanism. In the pipeline mechanism, basically instruction processing is divided into processing units that can be executed with the same number of clocks. Also, it is possible to increase the speed by overlapping execution of continuous instructions, and performing parallel processing.

However, when interaction with hardware resources occurs during a leading/subsequent instruction in a pipeline, the execution of the instruction with an ideal clock cycle is obstructed. In that case, it is necessary for the pipeline mechanism to perform exceptional hardware operation such as temporarily stopping processing in the pipeline. The pipeline mechanism is designed such that this kind of exceptional hardware operation can be performed by the pipeline mechanism. However, many design problems of a pipeline mechanism occur because operations such as mentioned above often occur at start up, so it is necessary to test the pipeline in order to verify the aforementioned operation.

FIG. 21 is a block diagram of a prior pipeline testing system. FIG. 22 is a drawing explaining the test instructions and pipeline interlocks. The prior pipeline testing system will be explained using FIG. 21. First, a pseudo random number is generated by a random-number generating process 90. From this pseudo random number, a random instruction generation process 91 generates a random instruction string 92. This generated instruction string is executed by the pipeline run mechanism (pipeline processor) 93, and the results, which are the contents of the memory 97 and register 98, are dumped in a dump area 95.

On the other hand, the same generated instruction string is executed by a serial run mechanism or simulator 94, and similarly, the results, which are the contents of the memory 97 and register 98, are dumped to a dump area 96. In other words, the test results are obtained by the simulator or the serial run mode when there is a serial run mode in the hardware, and the pipeline mechanism is verified by comparing those results with the pipeline execution results.

In addition, the pipeline is verified by matching the execution results when the instruction string is serially executed and when it is executed by the pipeline under any conditions.

In other words, when the results do not match, it is possible to verify that there is something abnormal with the pipeline mechanism. In this test, it is necessary to verify the operation when there is interference with resources. In FIG. 22, the execution stage for each pipeline is shown with 'IF' being instruction fetch, 'D' is instruction decode, 'Reg' is register reference, 'E' is operation, 'MEM' is memory access, and 'W' is write. The execution status of the pipeline when executing each instruction string in this case is shown in FIG. 22.

In this example, between the second instruction (ADD) and the third instruction (SUB), a state of interference (register hazard) occurs with the resource GR4 (register), and the third instruction is interlocked by the pipeline mechanism. In order to verify that an interlock such as this is performed properly, it is necessary to generate a test instruction string for causing resource interference to occur.

In a conventional test method, random instruction code was entered to the pipeline to cause a situation, where at certain timing, interaction with a hardware resource occurred by chance, or execution of the instruction string repeated that caused the interaction with the resource by chance. And the pipeline was verified by using its accident and design of the pipeline was improved from the verification results.

In this method, a pseudo random number was used to cause interaction with a hardware resource by chance, and by repeatedly entering an instruction string to the pipeline that often caused resource interaction to occur, design errors in the interlock mechanism of the pipeline were detected, and verification was performed expecting that after a set amount of time, quality of the interlock mechanism could be assured.

However, in this method, verification is not enough in the case that interlocks occur at timing in all stages of the pipeline. In other words, since the state of the pipeline is not considered at all, it is not possible to gain an understanding of which stage in the pipeline the interlock occurred, or what the leading/subsequent instruction at that time was. Therefore, important test items are lost, and there are no indicators for correctly evaluating the design quality. Also, since the instruction string employs randomness, redundancy is common and thus making the method inefficient.

In order to prevent these problems, there is one proposed idea to automatically generate a test instruction string to cause the interaction of the resource (for example, Japanese Laid Open Patent 7-73037). In this proposal, times to occupy the hardware resource of each instruction are inputted as a specification data, the test instruction is created by listing the competed status between a plurality of instructions and linking the instructions which have the completed status.

In verification of the interlock mechanism of the pipeline, it is important to perform a comprehensive test to learn the interlock conditions at each stage of the pipeline, and what instructions are in the pipeline when an interlock occurs. However, in the prior method there are the following problems.

(1) It is necessary to enter the specifications, however in the design verification step when specifications are changed frequently, it is necessary to enter the specifications each time, and this takes time.

(2) When there are mistakes or errors in the specifications, the instruction string will be totally meaningless. For example, due to recent high-speed processing, the time required for one stage in the pipeline is on the order of nano seconds, so it is very difficult to enter that small of an interval and generate the required instruction string.

(3) As described above, in order to generate an instruction string for comprehensively verifying the interlocks at each stage of the pipeline, it is necessary to enter many conditions, and realistically this is very difficult.

(4) With a simple CPU (processor), it is possible to enter the specifications with the prior manual procedure, and to generate a test instruction string, however with recent CPUs, there are hundreds of kinds of instructions and even just one instruction is a parallel instruction as is VLIW. Therefore, it is nearly impossible to manually enter all of the interference patterns.

SUMMARY OF THE INVENTION

The objective of this invention is to provide a pipeline testing method, pipeline test system, pipeline test instruction string generation method and storage medium for automatically setting interference conditions, and selecting two objective instructions.

Another objective of this invention is to provide a pipeline testing method, pipeline test system, pipeline test instruction string generation method and storage medium for automatically generating an instruction string in the interference state without entering conditions.

A further objective of this invention is to provide a pipeline testing method, pipeline test system, pipeline test instruction string generation method and storage medium for automatically and comprehensively generating an instruction string in the interference state without entering the conditions.

Still a further objective of this invention is to provide a pipeline testing method, pipeline test system, pipeline test instruction string generation method and storage medium for generating an instruction string in the interference state for high-speed processors and in the case of many kinds of instructions as well.

One form of the pipeline testing method of this invention comprises: a generation step of generating a test instruction string for a pipeline; a step of executing the generated instruction string by the processor; and a step of verifying the pipeline mechanism of the processor. In addition, the generation step comprises: a step of generating a leading instruction and subsequent instruction; a step of analyzing the leading instruction and setting the resource used by the leading instruction in a setting table; and a step of setting the resource used by the subsequent instruction according to the set resource, and generating a subsequent instruction which interferes with the resources that the leading instruction uses.

One form of the pipeline-testing-instruction-string-generation method of this invention comprises: a step of generating a leading instruction and subsequent instruction; a step of analyzing the leading instruction and setting the resource used by the leading instruction in a setting table; and a step of setting the resource used by the subsequent instruction according to the set resource, and generating a subsequent instruction which interferes with the resources that the leading instruction uses.

Furthermore, the program storage medium of the invention stores the program for executing on the processor: a step of generating a leading instruction and subsequent instruction; a step of analyzing the leading instruction and setting the resource used by the leading instruction in a setting table; and a step of setting the resource used by the subsequent instruction according to the set resource, and generating a subsequent instruction which interferes with the resources that the leading instruction uses.

In this form of the invention, the automatically generated instructions are analyzed in order to generate instructions that cause interference. In other words, randomness of the operand of a random instruction is used, and to cause interaction between hardware resources of the leading instruction and subsequent instruction, there is a table for notifying the subsequent instruction of the status of use of the resource by the leading instruction. Also, by generating resources to be used by the subsequent instruction according to the resource usage status in the table, a subsequent instruction which interferes with the resources used by the leading instruction is generated.

Therefore, it is possible to automatically generate a subsequent instruction that interferes with the resources used by the leading instruction without having to enter the interference conditions. Moreover, it is possible to generate an instruction string that causes interference for each kind of instruction even when there are many kinds of instructions. Furthermore, since the instruction string is generated by analyzing actual status instead of time data, it is possible to generate an instruction string that causes interference even when the occupying time of each stage in the pipeline is very short. This makes it easy to comprehensively verify the pipeline.

Next, in another form of the pipeline testing method of this invention, the generation step further comprises a step of inserting an instruction, that does not interfere with the resource, in between the leading instruction and the subsequent instruction whose resource interferes.

Another form of the pipeline-test-instruction-string generation method of the invention further comprises a step of inserting an instruction, that does not interfere with the resources, in between the leading instruction and the subsequent instruction whose resource interferes.

This form of the invention comprehensively generates timing for interaction between the hardware resources of the leading instruction and subsequent instruction to occur. An interlock state can occur at set timing (specific pipeline stage) even though interaction between the resources of the leading instruction and subsequent instruction is made to occur. Therefore, in order to generate the interlock status at each timing (each pipeline stage), testing is performed by shifting the leading instruction and the subsequent instruction one by one instruction in the pipeline stage. In order to do that, an instruction that does not interfere with the resources is inserted between the leading instruction and subsequent instruction.

Since an instruction that does not interfere with the resources is inserted, it is possible to perform interference between the leading instruction and subsequent instruction at each stage, and to create the instruction string for that.

BRIEF DESCRIPTION OF THE DRAWINGS

FIG. 22 is a drawing explaining the interlock operation of the prior art.

DESCRIPTION OF THE PREFERRED EMBODIMENTS

The embodiments of this invention will be explained below in the order: pipeline testing system, test-instruction-string generation method, and test-instruction-string generation process.

Pipeline Testing System

Figure 1:
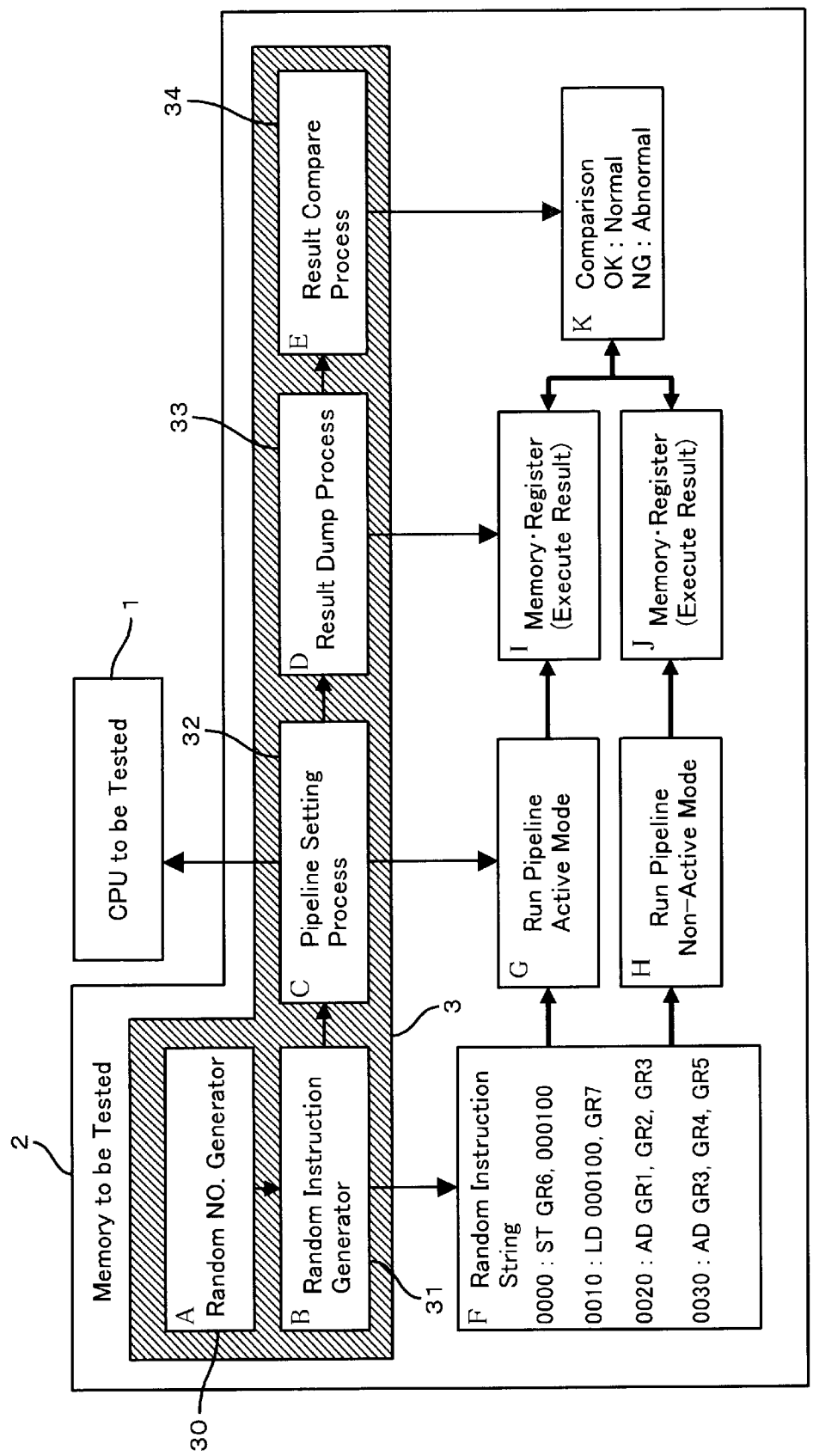
FIG. 1 is a block diagram of the test system of an embodiment of the invention.
Figure 2:
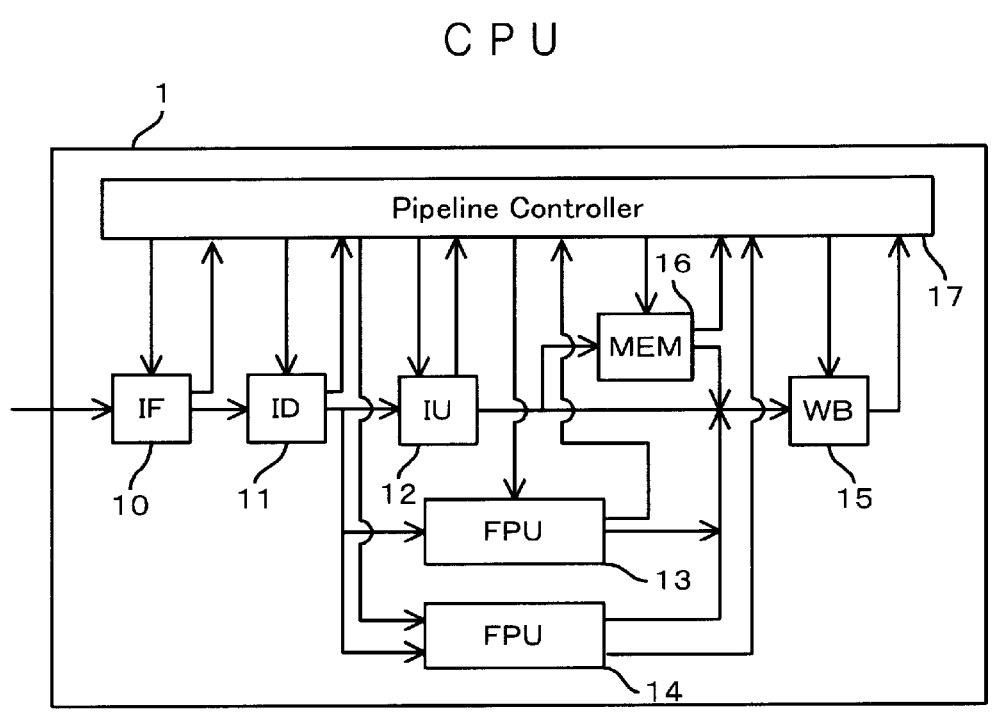
FIG. 2 is a block diagram of the CPU in FIG. 1 that is tested.

FIG. 1 is a block diagram of the pipeline testing system of an embodiment of the invention, and FIG. 2 is a block diagram of the device to be tested, which is a processor having a pipeline mechanism.

As shown in FIG. 1, the device to be tested comprises a CPU 1 and a memory 2. The CPU 1 is the target of verification by the testing method of this invention, and as shown in FIG. 2, it is a processor comprising a pipeline control mechanism 17. First, the processor 1 will be explained using FIG. 2. The pipeline control mechanism 17 is the target of verification by the method of this embodiment, and it detects the occurrence of an instruction, and determines whether to proceed with or to stop processing at a pipeline stage. The stages 10 to 16 are the stages of the pipeline and they are instructed by the pipeline control mechanism 17 to proceed with or to stop processing.

The stages 10 to 16 comprise: an instruction fetch unit 10 that corresponds to the 'IF' stage which reads an instruction from the memory 2 that corresponds to the program counter; an instruction decoding unit 11 that corresponds to the 'ID' stage which reads the necessary operand from the register and decodes the instruction; an integral/logical operation unit 12 that corresponds to the 'IU' stage and which performs integral or logical operations; a floating-decimal-point operation unit 13, 14 that corresponds to the 'FPU' stage and which performs floating-decimal-point operations; a memory access unit 16 that corresponds to the 'MEM' stage and which performs memory access, and a write-back unit 15 that corresponds to the 'WB' stage and which writes back to the register.

In this processor 1, the number of instruction that fetches during one clock cycle is one. Also, below, the integral/logical operation unit 12 and the floating-decimal-point operation unit 13, 14 are combined and called the operation unit below.

Returning to FIG. 1, the test program 3 is loaded in the memory 2. The test program 3 comprises: a random number generation process section 30 that generates random numbers; a random-instruction generation process section 31 that generates a random instruction string using the random number; a pipeline setting process section 32 that controls the control register of the processor 1 and sets the processor 1 to the pipeline active mode or pipeline inactive mode; an execution-result dump process section 33 that dumps the execution results of the processor 1 from the memory/register to the memory 2, and a execution-result comparison process section 34 that compares the dumped execution results and determines whether the pipeline is normal or abnormal. As described above, these are the test program and each block is expressed as a functional block of the program.

Next, the testing operation of this system will be explained. In this test method, the processor 1 to be tested executes an identical instruction string in both the pipeline active mode and pipeline inactive mode, and the test results, or in other words the dump results of the general register and memory, are compared to verify whether the pipeline function operated properly.

First, the test program 3, comprising sections 30- to 34 described above, is loaded in the memory 2 of the CPU 1, and the CPU 1 is activated. The CPU 1 executes the random-number generation process 30 and generates a random number, then with the random-instruction generation process 31, generates a random instruction string 'F' by using the random number and saves it in memory.

With the pipeline setting process 32, CPU 1 accesses the control register in the CPU1, and sets the CPU1 to the pipeline-active mode. Then, as shown by 'G' in the figure, the CPU1 executes the random instruction string F by using a pipeline mechanism. Next, with the execution-result dump process 33, CPU 1 stores the memory dump 'I' in the memory.

Next, with the pipeline setting process 32, CPU 1 accesses the control register in the CPU1 and sets the CPU1 to the pipeline-inactive mode. Then, as shown by 'H' in the figure, the CPU1 executes the random instruction string F without using a pipeline. Next, with the execution-result dump process 33, CPU 1 stores the memory/register dump 'J' in the memory.

Furthermore, with the execution-result comparison process 34, CPU 1 compares the saved memory/register execution results 'I', 'J'. When the comparison results are good, the pipeline mechanism 17 is determined to be normal. When the comparison results are not good, it is determined that there is some design problem with the pipeline mechanism 17.

The test program is loaded in the processor to be tested in this way and instructions are generated, executed and compared in this way, making it possible to verify the pipeline mechanism of the CPU1 without using any other devices.

Figure 3:
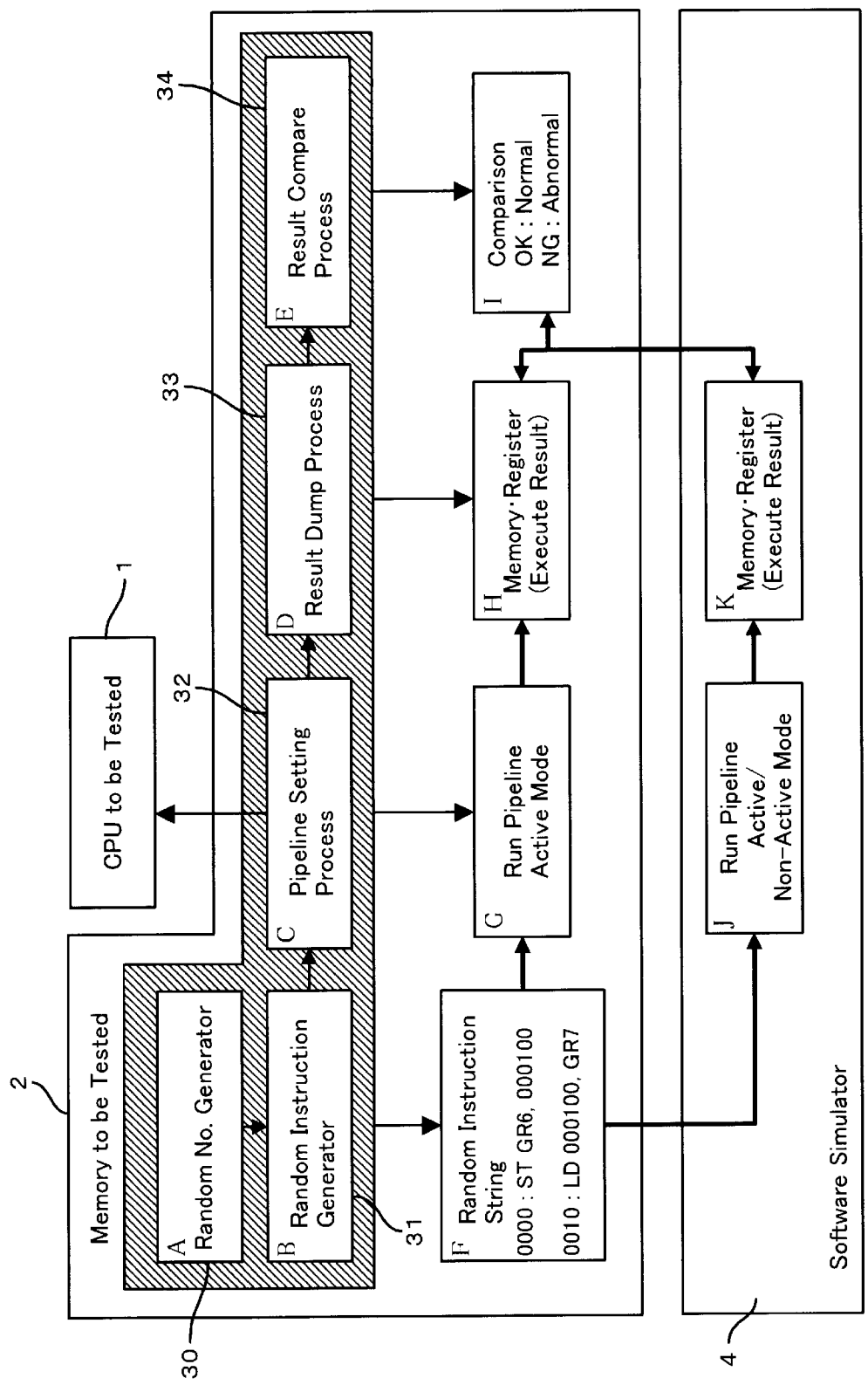
FIG. 3 is a block diagram of the test system of another embodiment of the invention.

FIG. 3 is a block diagram of a pipeline testing system for another embodiment of the invention. Items that are the same as those in FIG. 1 are indicated with the same symbols. In this embodiment of the invention, a separate simulator 4 is used to execute the instruction string. The operation will be explained below.

First, the test program 3, comprising section 30 to 34 described above, is loaded in the memory 2 of the CPU1 and the CPU1 is activated. The CPU 1 executes the random-number generation process 30 and generates a random number, then with the random-instruction generation process 31, CPU 1 generates the random instruction string 'F' using the generated random number and saves it in memory.

With the pipeline setting process 32, CPU 1 accesses the control register in the CPU1, and sets the CPU1 to the pipeline-active mode. Then, as shown by 'G' in the figure, the CPU1 uses pipeline control, and executes the random instruction string 'F'. Next, with the execution-result dump process 33, it stores the memory dumpy 'I' in the memory.

Next, the random instruction string 'F' in the memory 2 is loaded into the software simulator 4. When there is a pipeline mechanism in the simulator 4, it is set to the pipeline active/inactive mode as necessary. In this case, either is okay. The simulator 4 executes the random instruction string 'F'.

Next, with the execution-result comparison process 34, it reads the memory/register execution results 'K' of the simulator 4 and compares them with the saved memory/register execution results 'H'. When the comparison results are good, the pipeline mechanism 17 is determined to be normal. When the comparison results are poor, it is determined that there is some design problem with the pipeline mechanism 17.

In this way it is possible to perform testing with the use of a simulator. In addition, by loading the test program into the simulator, the simulator 4 is able to execute the aforementioned processes 30 to 34.

Test-instruction-string Generation Method

Figure 4:
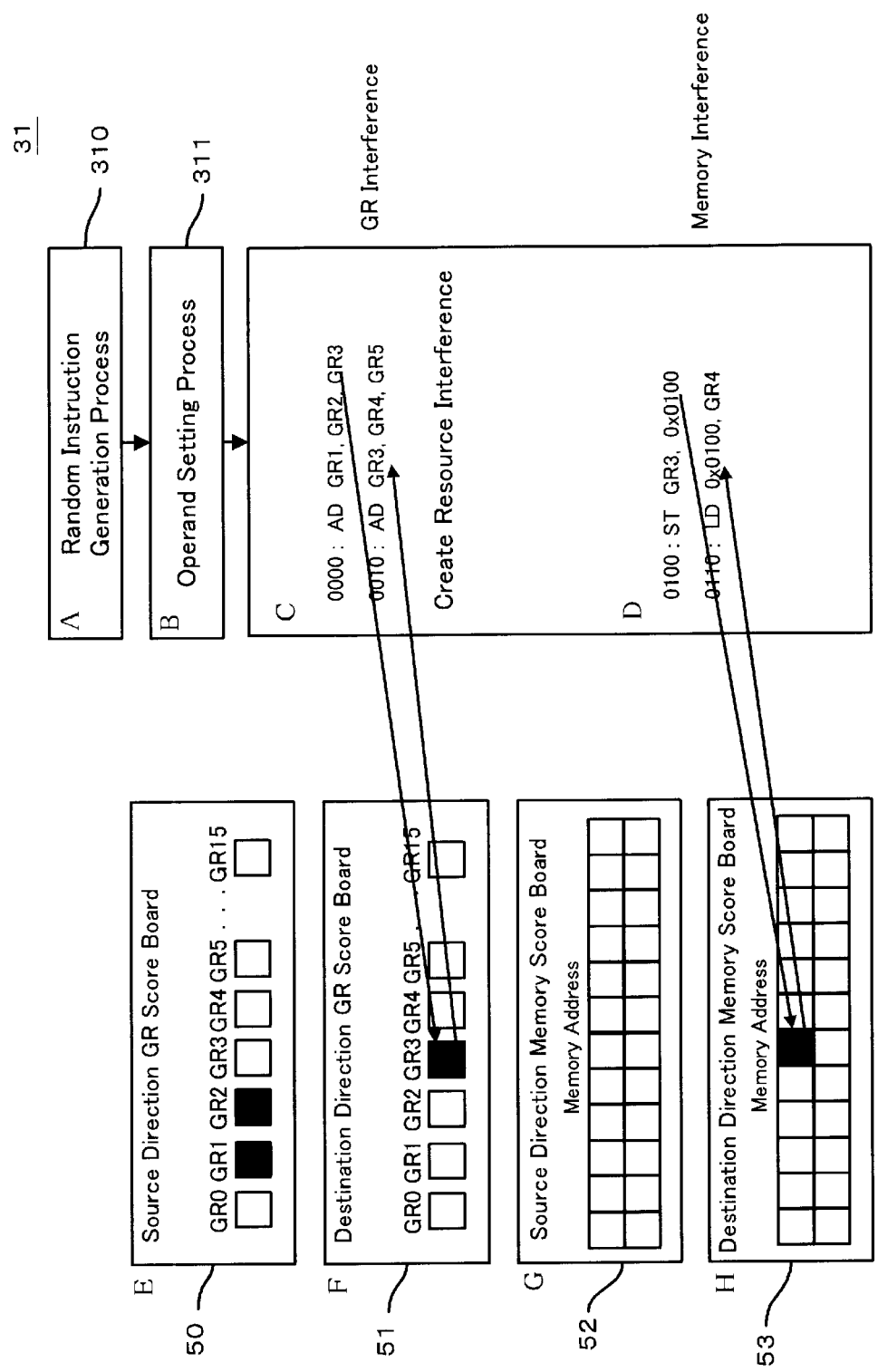
FIG. 4 is a drawing explaining the resource interference process of the test-instruction-string generation process in FIG. 1.

Next, the random-instruction generation process 31 in FIG. 1 and FIG. 3 will be explained. FIG. 4 is a drawing explaining the instruction generation process, which performs resource control, of an embodiment of the invention, FIG. 5 is a drawing explaining the comprehensive instruction generation process of an embodiment of the invention, and FIG. 6 is a drawing explaining the instruction generation process with no resource interference of an embodiment of the invention.

Figure 5:
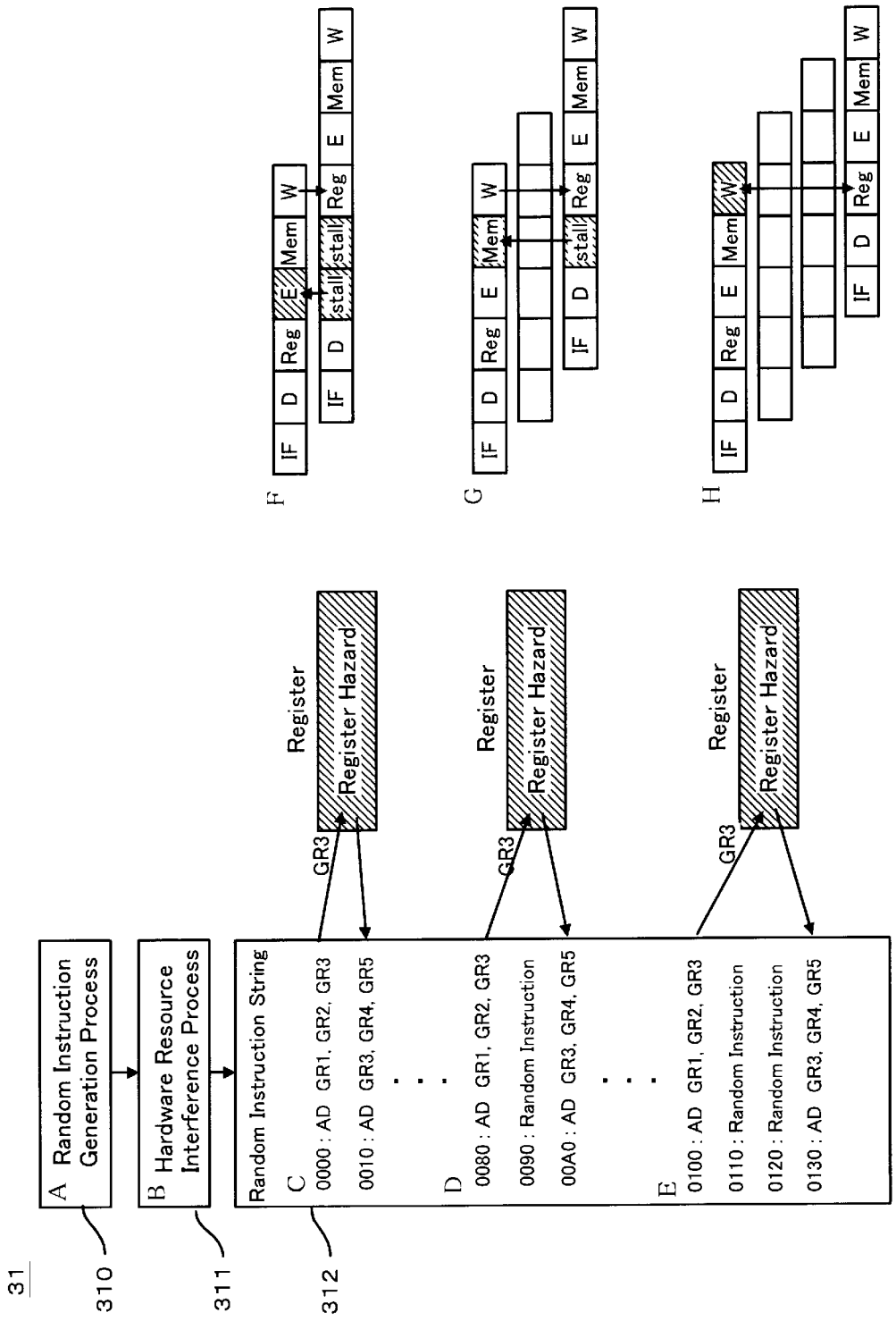
FIG. 5 is a drawing explaining the comprehensive instruction generation process of the test-instruction-string generation process in FIG. 1.
Figure 6:
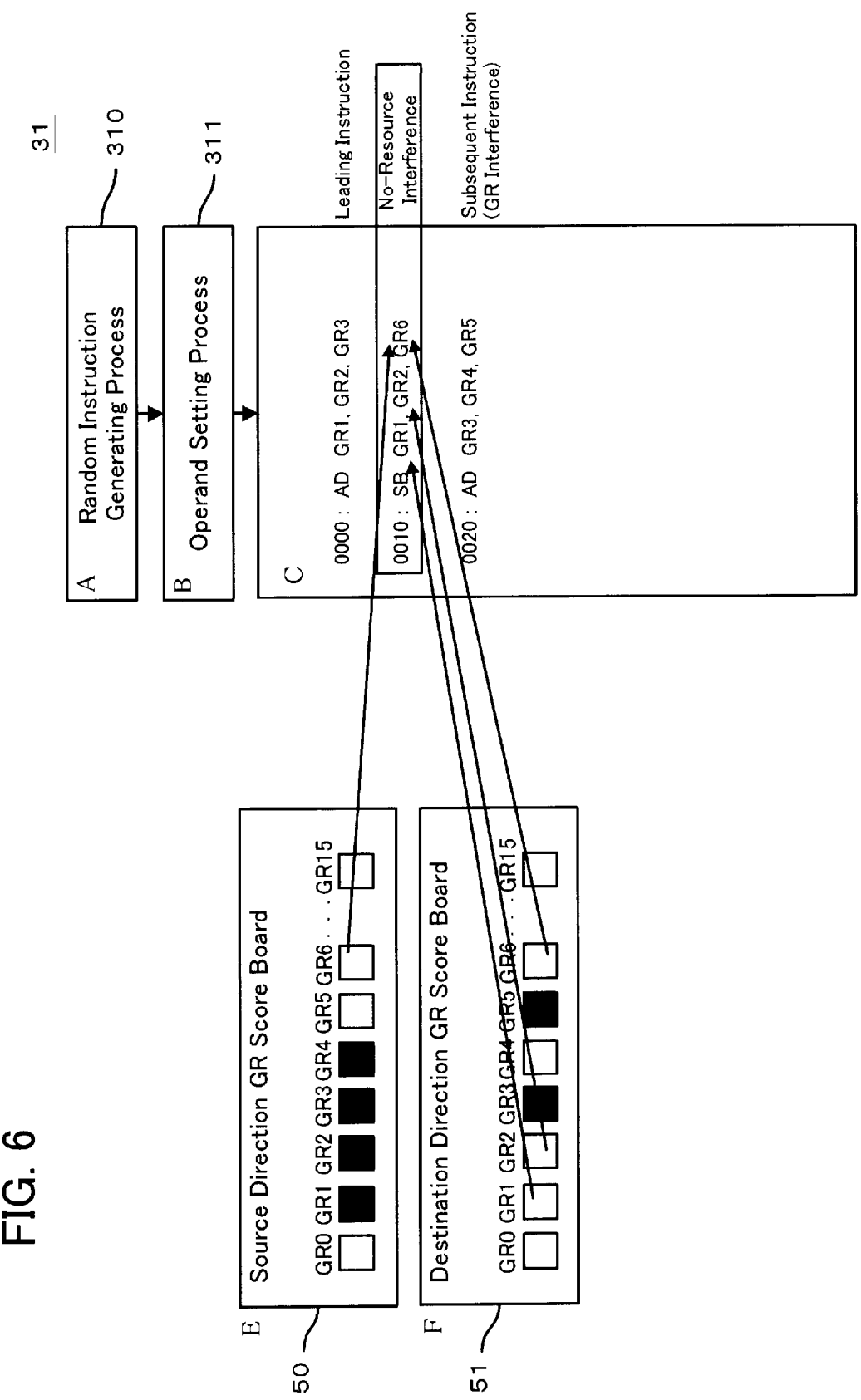
FIG. 6 is a drawing explaining the generation process in FIG. 5 for generating a non-interfering instruction.

In this invention, in order to generate a random instruction the interferes with a resource, in the random-instruction generation process 31, there is a new hardware resource control process (call the resource interference process) 311 that is used by the random instruction, as shown in FIG. 4, and a process 312 that generates timing for the comprehensive hardware resource interaction by the leading and subsequent instructions, as shown in FIG. 5.

First, in order for the hardware resource control process (operand setting process) 311 between the instructions in FIG. 4, to actually cause interaction of the hardware resources by the leading and subsequent instructions, that were generated using the randomness of the random instruction operand, as shown in FIG. 4, scoreboards (used resource control table) 50 to 53 are provided.

These scoreboards 50 to 53 are used to notify the subsequent instruction of the status of usage of the hardware resources by the leading instruction. For example, the GR (general register) scoreboard, which manages the status of usage of the register, comprises a scoreboard 50 for the GR on the SOURCE side, and a scoreboard 51 for the GR on the DESTINATION side.

When the random instruction 'AD GR1, GR2, GR3' (C in FIG. 4) shown at the generated address 0000 by the random instruction generation process 310 is the leading instruction, first, the data of the leading instruction is set in the SOURCE-direction GR scoreboard 50 and the DEST-direction GR scoreboard 51.

In the aforementioned instruction (AD: Add instruction), GR1 (general register 1) and GR2 (general register 2) are added, and the added value is stored in GR3 (general register 3). Therefore, since GR1 and GR2 are the SOURCE-GR, GR1 and GR2 are marked in the SOURCE-direction GR scoreboard 50 (in the figure they are shaded in black). Furthermore, since GR3 is the DEST-GR, GR3 is marked in the DEST-direction GR scoreboard 51.

Next, in the operand setting process 311 for the subsequent instruction of the next address 0010, it is possible to cause interaction with the hardware resources by referencing the contents of the scoreboards 50 to 53 that were set by the leading instruction. For example, when a GR interference request occurs for the instruction of address 0010 (when an instruction which interferes with a GR is specified), first, in order to check the DEST-GR of the leading instruction (in this case, GR interference is Read After Write interference), the DEST-direction GR scoreboard 51 is referenced.

From here, the marked GR numbers are fetched, and set as the SOURCE-GR for address 0010. In this case, since GR3 is marked in the DEST-direction GR scoreboard by the leading instruction, that GR3 is set as the SOURCE-GR by the subsequent instruction.

The explanation above, explained interference with a register resource, next interference with a memory resource will be explained. For interaction of memory resources, in order to manage use of the memory resources, there is a SOURCE-direction memory scoreboard 52 and a DESTINATION-direction memory scoreboard 53. In other words, the scoreboards 52, 53 segment and manage the access area of the random instructions. The operation is the same as for the GR (register) operation.

This is explained with the figures. The leading instruction at address 0100 (ST: storage instruction), is an instruction to store the data of GR3 (general register 1) in the address '0x0100' of the memory. Therefore, since the address '0x0100' is a DEST-memory, the appropriate point in the DEST-direction memory scoreboard 53 is marked.

Next, in the operand setting process 311 for the subsequent instruction (LD: load instruction) at the next address 0110, it is possible to cause interaction with the hardware resources by referencing the contents of the scoreboards 52 and 53 that are set by the leading instruction. For example, when there is a memory interference request (when an instruction having memory interference is specified) for the instruction at address 0110, first, the DEST-direction memory scoreboard 53 is referenced in order to check the DEST-address of the leading instruction.

From here, the marked memory address is fetched, and it is set as the SOURCE-address for address 0110. In this case, the memory address marked in the DEST-direction memory scoreboard 53 by the leading instruction is set as the SOURCE-address for the subsequent instruction.

In addition to causing interaction of resources, this kind of resource control, which uses scoreboards, can also be used to generate instructions that do not cause interaction with resources.

Next, the method of generating timing for comprehensive hardware resource interaction between the leading and subsequent instructions will be explained. Normally, only in the case of using a method such as shown in FIG. 4 to cause resource interaction between the leading and subsequent instructions, do interlocks occur at a set timing (a particular pipeline stage). Therefore, a method for comprehensively verifying at each stage whether or not the interlock mechanism is operating properly in the pipeline is necessary.

As a measure for solving this problem, a method is used that saves the randomly generated leading and subsequent instructions that cause interference, and execution is performed by shifting those instructions one by one instruction at a time through the stages of the pipeline. By using this method, it is possible to comprehensively verify the interlock timing between two objective instructions.

An example is shown in FIG. 5. First, two random instructions are created by the random-instruction generation process 310. These two instructions pass through the hardware-resource interference process 311 to cause resource interference. Here, the process in FIG. 4 is performed to cause resource interference between the two instructions. In this case, as shown by C in FIG. 5, the two instructions 'AD GR1, GR2, GR3' and 'ADD GR3, GR4, GR5' are generated, and cause RAW (Read After Write) interference with GR3.

After the two instructions for causing interference are set, next they enter the shifting process 312. First, as shown by 'C' in FIG. 5, the two instructions are lined up tested as are. In this case, an interlock waiting for GR3 of the subsequent instruction occurs in the pipeline at the E (operation) stage of the leading instruction, and a stalled state (F in FIG. 5) continues until the value for GR3 is set in the W (write stage) of the leading instruction.

Next, as shown by 'D' and 'E' in FIG. 5, separate random instructions are placed between the two instructions, and as shown by 'G' and 'H' in FIG. 5, the interlock timing, is shifted one stage at a time. This is repeated up to number of pipeline stages −1. In this way, it is possible to comprehensively verify the interlock timing between two instructions at each stage.

At this time, the random instruction that is placed between the two instructions with resource interference, should not interfere with the resources being used by the two interfering instructions. In other words, in the case that it interfered, there is the possibility that the interference timing of the two instructions would shift. Here, the scoreboards shown in FIG. 4 are used to generate an operand that will not interfere with the resources.

An example is shown in FIG. 6. First, the resources used by the two instructions that cause resource interference are set in the SOURCE-direction scoreboard 50 and DEST-direction scoreboard 51. In this case, GR1, GR2, GR3 and GR4 are set as the SOURCE-GR in the SOURCE-direction scoreboard 50, and GR3 and GR5 are set as the DEST-GR in the DEST-direction scoreboard 51.

Here, between address 0000 and 0020, an SB instruction is set that will no have resource interference with the two instructions. First, when setting the SOURCE-GR for this instruction, in order that no access interference will occur with the same resources SOURCE—>DEST or DEST—>SOURCE, a resource is selected from the DEST-direction scoreboard 51 that is not marked. Since there is no interference for SOURCE<—>SOURCE, the contents of the SOURCE-direction scoreboard 50 will not be considered.

When setting DEST-GR, there is interference in both the SOURCE direction and DEST direction, so an unmarked resource is selected from both the SOURCE-direction scoreboard 50 and DEST-direction scoreboard 51. With this method, it is possible to create an instruction that shifts the clock timing without affecting the two instructions to be tested that have resource interference.

The instruction operation in an actual pipeline, varies due to the CPU architecture or instruction type, however, the major operations such as setting or referencing resources, performing operations or finally storing the results in resources was nearly the same for all instructions. Therefore, all of the instruction operations, such as setting or referencing resources, performing operations or storing the results, can be modeled to improve processing efficiency. The length of the instruction operation is taken to be the length of pipeline sections. Implementation is simplified with the use of this model, and the effect of shifting the interlock timing can be sufficiently obtained.

Figure 7:
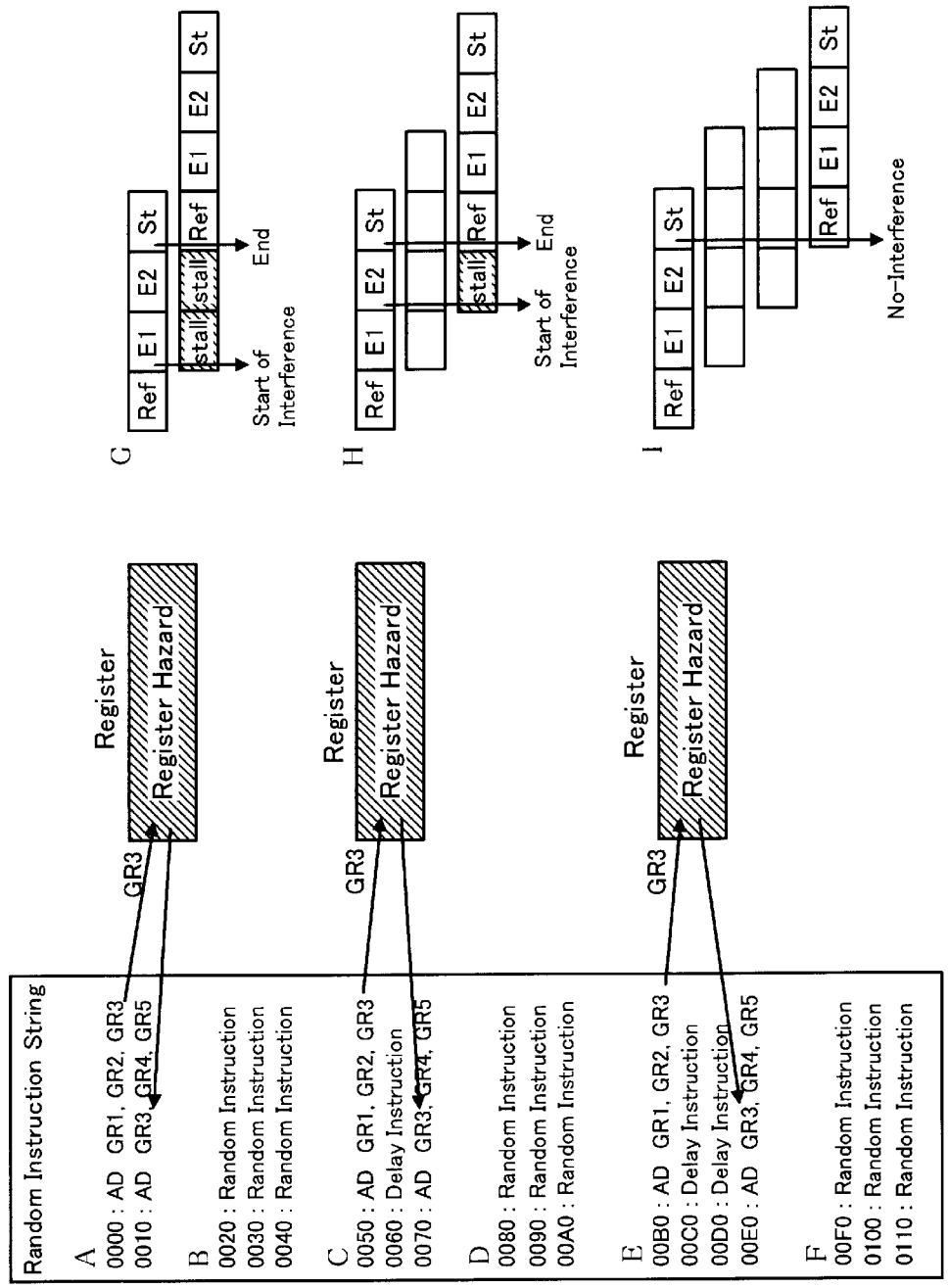
FIG. 7 is a drawing explaining the generation process in FIG. 5 for generating an instruction that interferes with the register.
Figure 8:
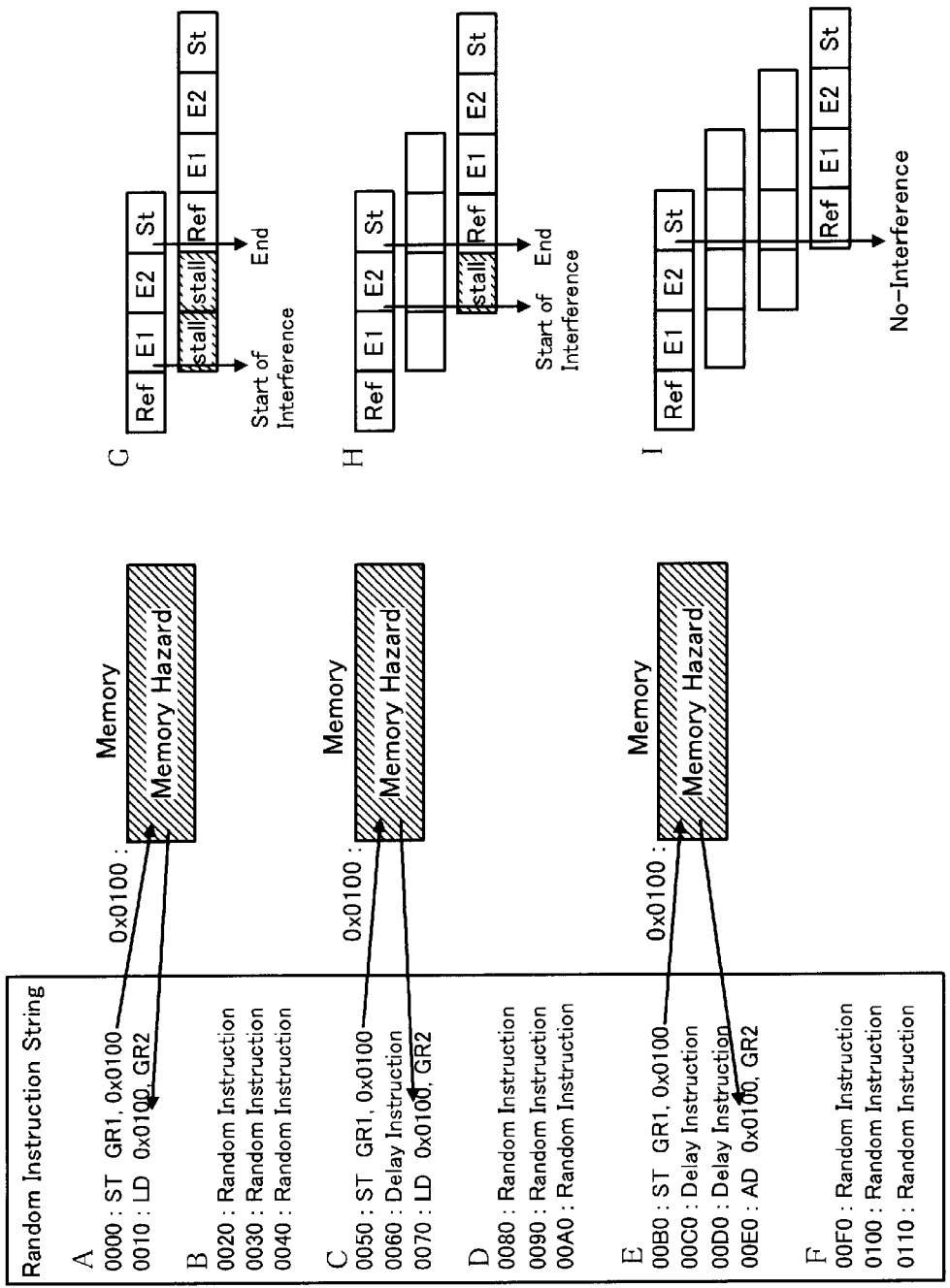
FIG. 8 is a drawing explaining the generation process in FIG. 5 for generating an instruction that interferes with the memory.

Next, an embodiment for comprehensively generating the timing when register interlocks and memory interlocks occur in the pipeline will be explained in more detail. FIG. 7 is a drawing explaining generation of a register interference instruction, and FIG. 8 is a drawing explaining generation of a memory interference instruction.

First, an example of register interference will be explained. As shown by 'A' in FIG. 7, first, a leading and subsequent instructions that cause register interference are created. Here, DEST-GR3 of the leading instruction is accessed by SOURCE-GR3 of the subsequent instruction and causes RAW interference. As the pipeline is observed, state 'G' shown in FIG. 7 occurs, and an interlock of the subsequent instruction occurs at the timing of the stage E1 (operation 1) of the leading instruction.

This is inserted, as shown by 'C' and 'E' in FIG. 7, between the two instructions while increasing the number of delay instructions one at a time for shifting the timing. In this way, as shown by 'H' and 'I' in FIG. 7, it is possible to shift the timing that causes an interlock in the pipeline, making it possible to comprehensively verify the interlocks.

In order that the delay instruction string that is placed in between the two interfering instructions does not shift the interlock timing of the interfering instruction string, an operand is set between the interfering instruction string and the delay instruction string such that no resource conflict occurs. Random instruction string blocks ('B', 'D', 'F' in FIG. 7), equal to the number of pipeline sections −1, are placed between each verification instruction string ('A', 'C', 'E' in FIG. 7), such that the effect of a verification instruction string does not carry over to the subsequent verification instruction string.

Next, memory interference will be explained. First, as shown by 'A' in FIG. 8, a leading and subsequent instruction that cause memory interference are created. Here, the DEST-address of the leading address is accessed by the SOURCE-address of the subsequent instruction, to cause RAW interference. When observing the pipeline, the state 'G' in FIG. 8 occurs, and an interlock of the subsequent instruction occurs at the timing of the E1 (operation 1) stage of the leading instruction.

This is inserted, as shown by 'C' and 'E' in FIG. 8, between the two instructions while increasing the number of delay instructions one at a time for shifting the timing. In this way, as shown by 'H' and 'I' in FIG. 8, it is possible to shift the timing that causes an interlock in the pipeline, making it possible to comprehensively verify the interlocks.

In order that the delay instruction string that is placed in between the two interfering instruction does not shift the interlock timing of the interfering instruction string, an operand is set between the interfering instruction string and the delay instruction string such that no resource conflict occurs. Random instruction string blocks ('B', 'D', 'F' in FIG. 8), equal to the number of pipeline sections −1, are placed between each verification instruction string ('A', 'C', 'E' in FIG. 8), such that the effect of a verification instruction string does not carry over to the subsequent verification instruction string.

Figure 9:
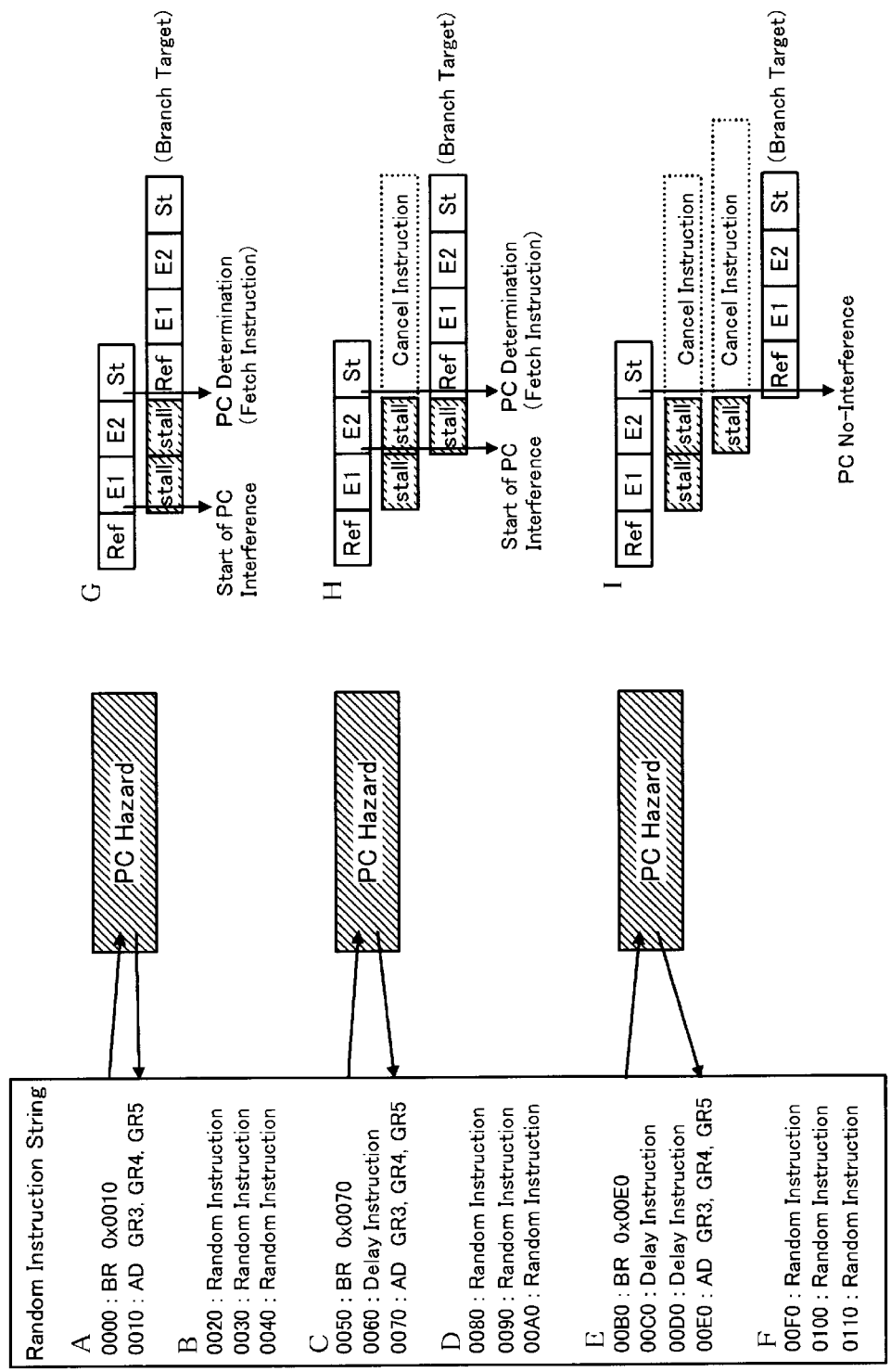
FIG. 9 is a drawing explaining the generation process in FIG. 5 for generating an instruction that interferes with the PC.

Next, an example of comprehensively causing a PC(program counter) hazard between a branch instruction and branch-destination instruction is explained using FIG. 9. In the branch instruction, the PC (program counter) value is referenced, the branch-destination address is calculated and PC write is performed, so until the PC is set, the subsequent instruction cannot be fetched and a stalled state occurs.

When the branch-destination address is set, the instruction existing at that address begins to be fetched, and any instruction in the pipeline before that is canceled ('G', 'H', 'I' in FIG. 9). When considering this, it could be said that RAW interference of the PC resource occurred.

First, as shown by 'A' in FIG. 9, leading and subsequent instructions that cause memory interference are created. Here, the subsequent instruction (add instruction) is set for the branch destination of the leading branch instruction. When observing the pipeline, the state 'G' in FIG. 9 occurs, and an interlock of the subsequent instruction occurs at the timing of the E1 (operation 1) stage of the leading instruction.

This is inserted, as shown by 'C' and 'E' in FIG. 9, between the two instructions while increasing the number of delay instructions one at a time for shifting the timing. In this way, as shown by 'H' and 'I' in FIG. 9, it is possible to shift the timing that causes an interlock in the pipeline, making it possible to comprehensively verify the interlocks.

Similar as was done for a GR or memory, shifting the interlock timing for a PC resource is also performed by inserting a delay instruction between the branch instruction and branch destination instruction. In this way it is possible to perform comprehensive testing by causing interlocks of the branch-destination instruction to occur at various timing of the branch instruction.

In this verification instruction string, the leading instruction must specify a branch instruction, and the subsequent instruction is a random instruction which becomes the branch instruction of the leading instruction. Therefore, each time the timing is shifted, the distance between the leading instruction and the subsequent instruction changes, so branch-destination address of the leading branch instruction must be updated so that it can branch to the subsequent instruction.

In this way, the automatically generated instruction is analyzed and an instruction is generated to cause a state of interference. In other words, the randomness of the operand of a random instruction is used to cause the leading instruction and subsequent instruction to interact with the hardware resource, so a table is formed for notifying the subsequent instruction of the status of usage of the resource by the leading instruction. Also, by generating the resource used by the subsequent instruction according to the status of resource usage in the table, it is possible to generate a subsequent instruction that will interfere with the leading instruction.

Therefore, it is possible to automatically generate a subsequent instruction that will interfere with the leading instruction without entering interference conditions. Moreover, it is possible to generate an instruction string having interference for each kind of instruction even when there are many kinds of instructions. Furthermore, since the instruction string is generated by analyzing the actual state instead of by using time data, it is possible to generate an instruction string that will cause a state of interference even when the time for each stage in the pipeline is short. This simplifies comprehensive verification of the pipeline.

Also, an interlock state occurs only at certain timing (a certain pipeline stage) even though there is interaction with a resource by the leading instruction and subsequent instruction. Therefore, in order that an interlock occurs at every timing (every pipeline stage), testing is performed by shifting the leading instruction and subsequent instruction one instruction at a time through the stages of the pipeline. In order to do that, an instruction that does not interfere with the resource is inserted between the leading instruction and subsequent instruction. Since an instruction that does not interfere with the resource is inserted, a state of interference between the leading instruction and subsequent instruction is possible at each stage, and it is easy to generate the instruction string.

Test-instruction-string Generation Process

Next, the instruction generation process will be explained based on the generation method.

Figure 10:
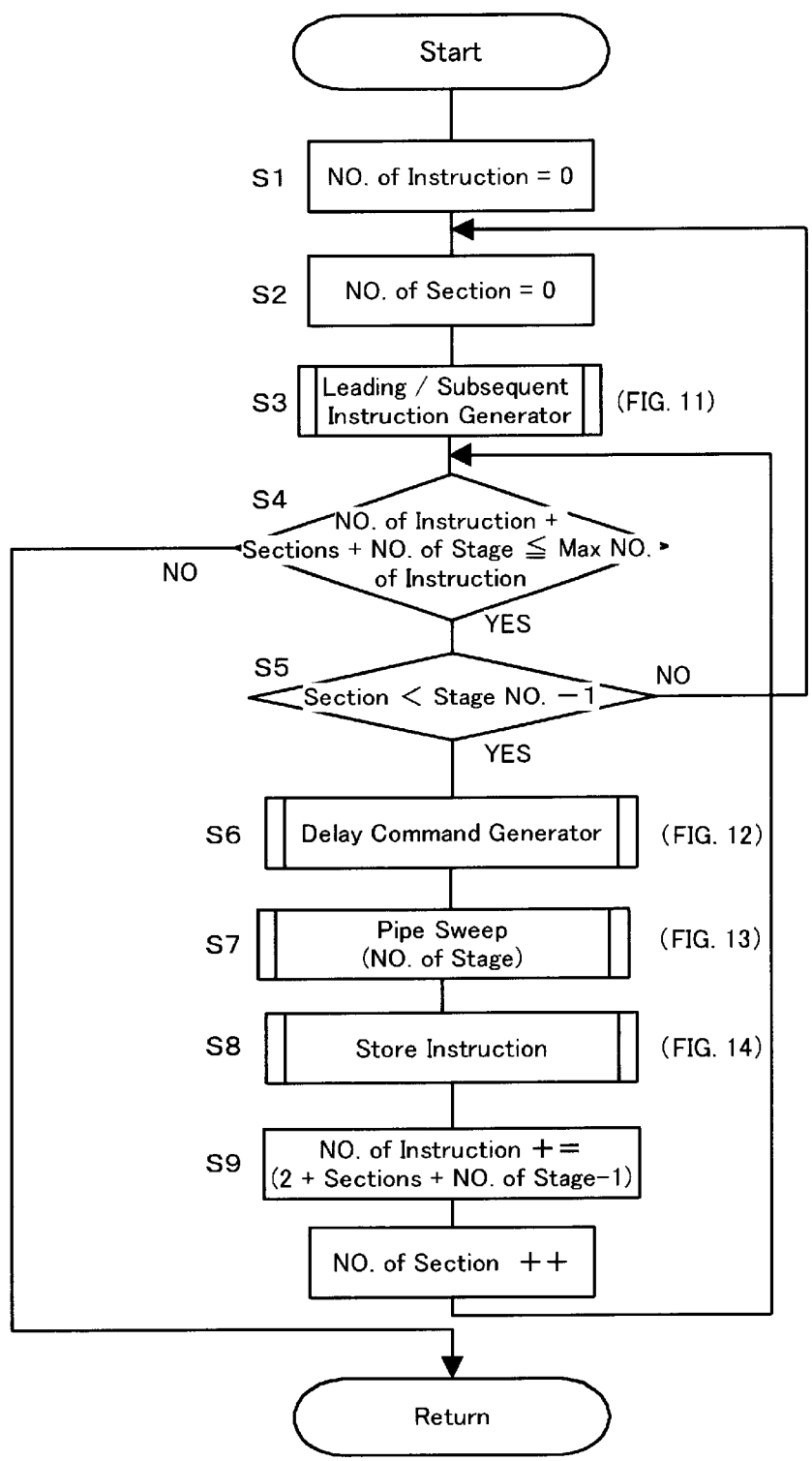
FIG. 10 is a flowchart of the GR/memory interference process in FIG. 5.
Figure 11:
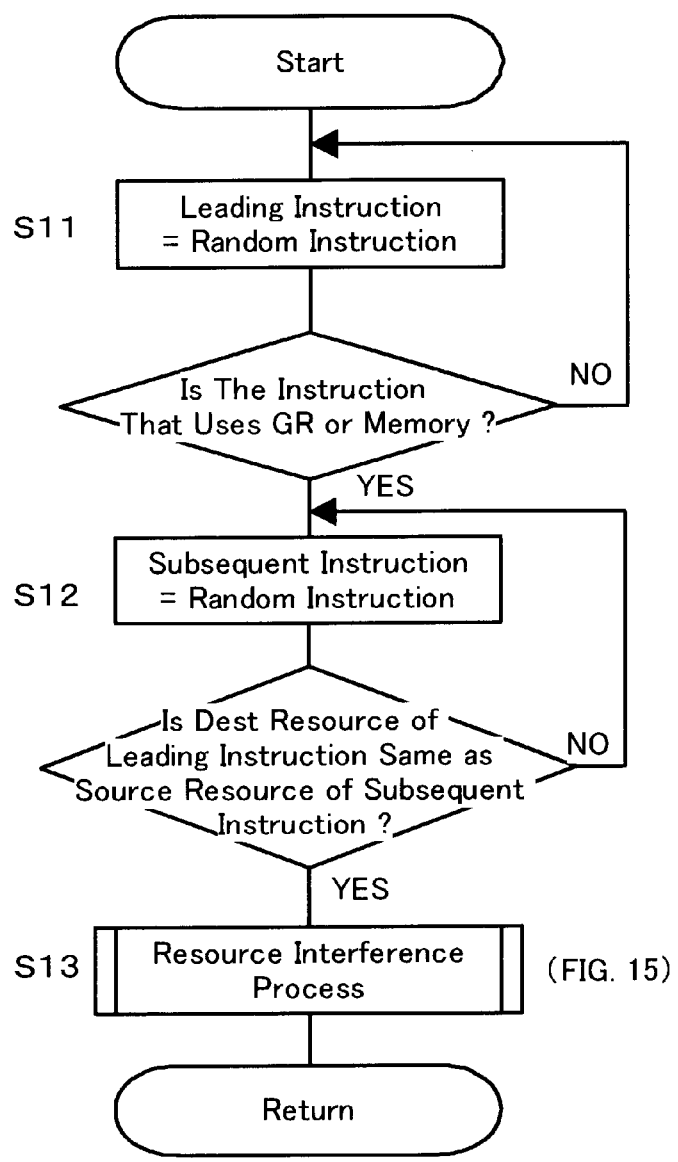
FIG. 11 is a flowchart of the leading/subsequent instruction generation process in FIG. 10.
Figure 12:
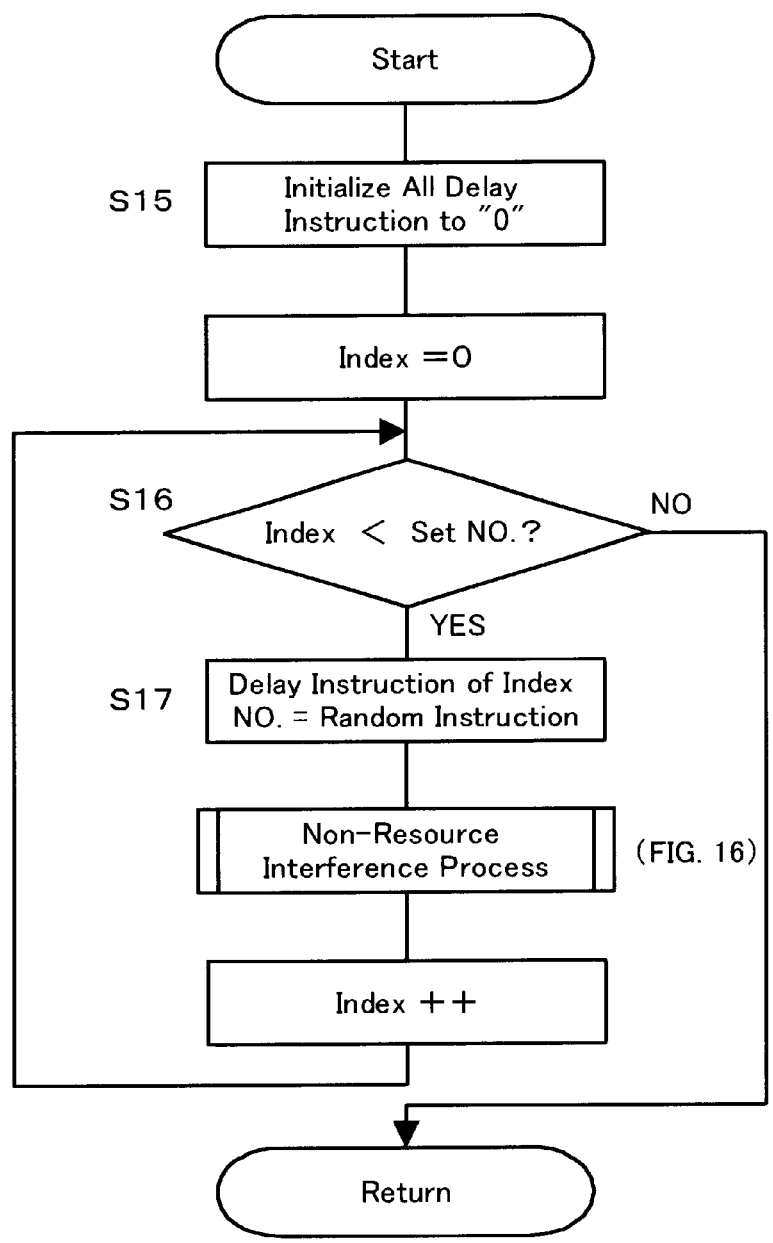
FIG. 12 is a flowchart of the delay instruction generation process in FIG. 10.
Figure 13:
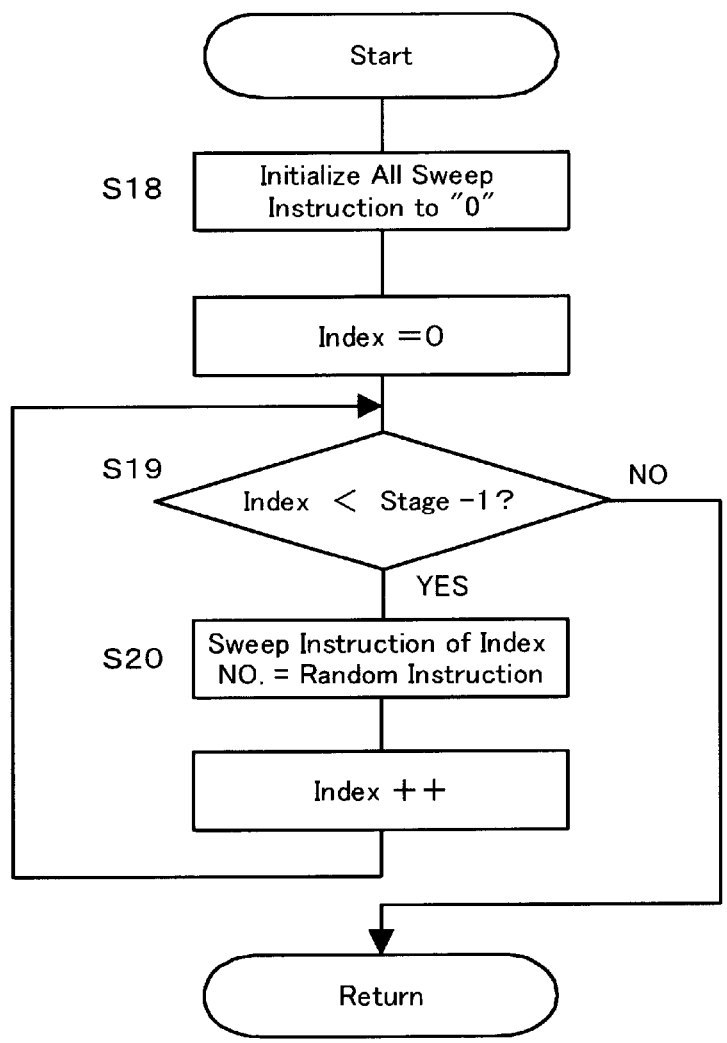
FIG. 13 is a flowchart of the PIPE sweep process in FIG. 10.
Figure 14:
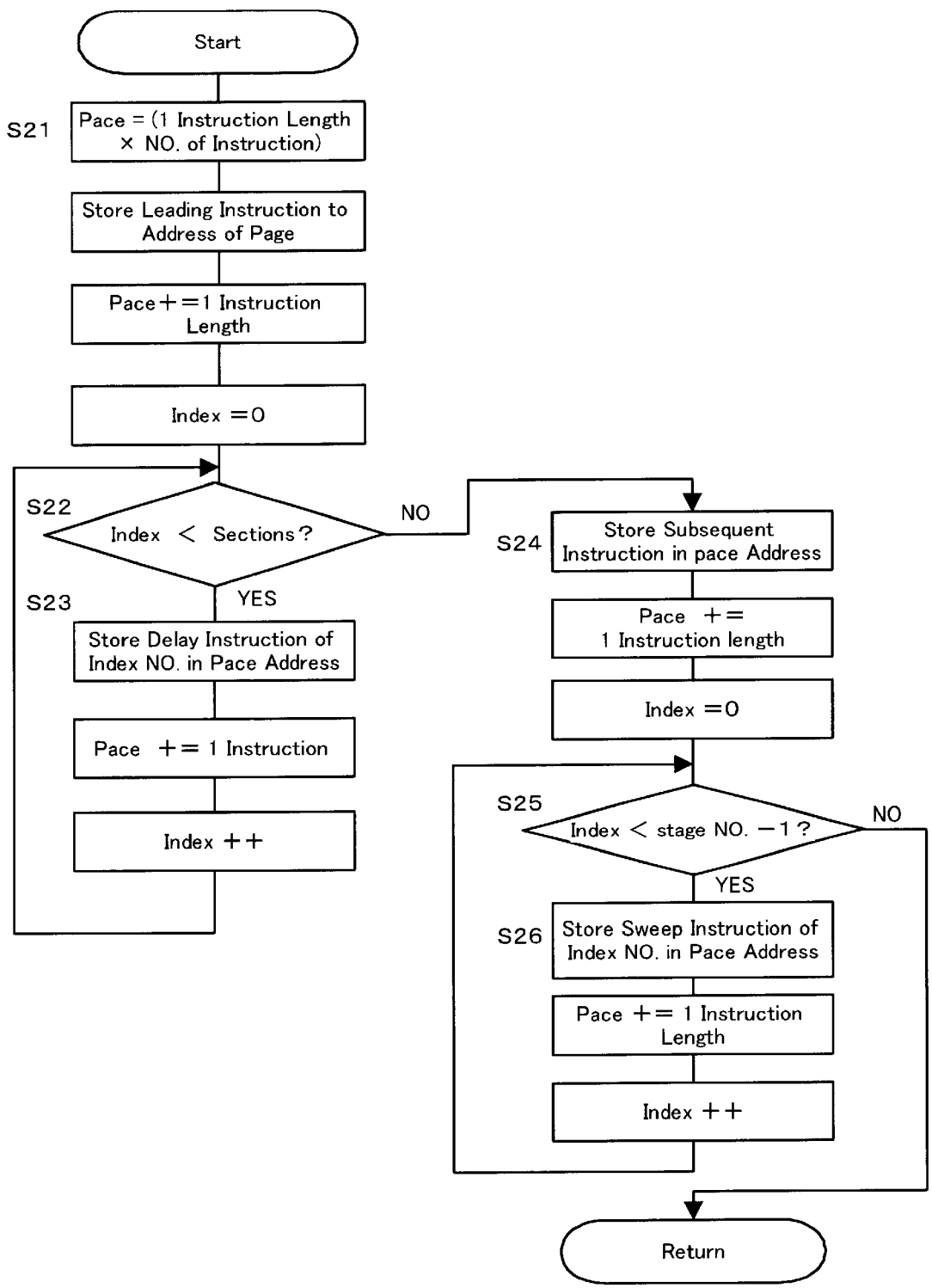
FIG. 14 is a flowchart of the instruction storage process in FIG. 10.
Figure 15:
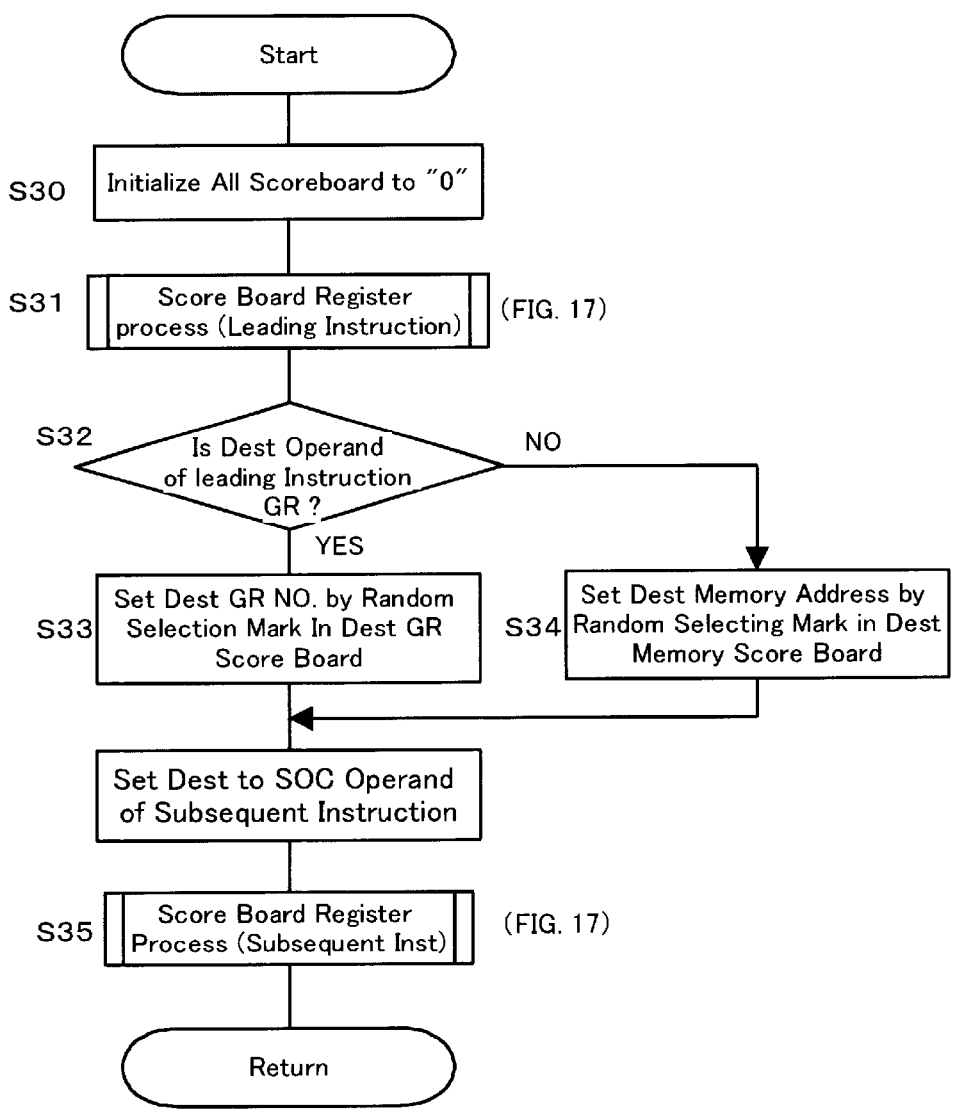
FIG. 15 is a flowchart of the resource interference process in FIG. 11.
Figure 16:
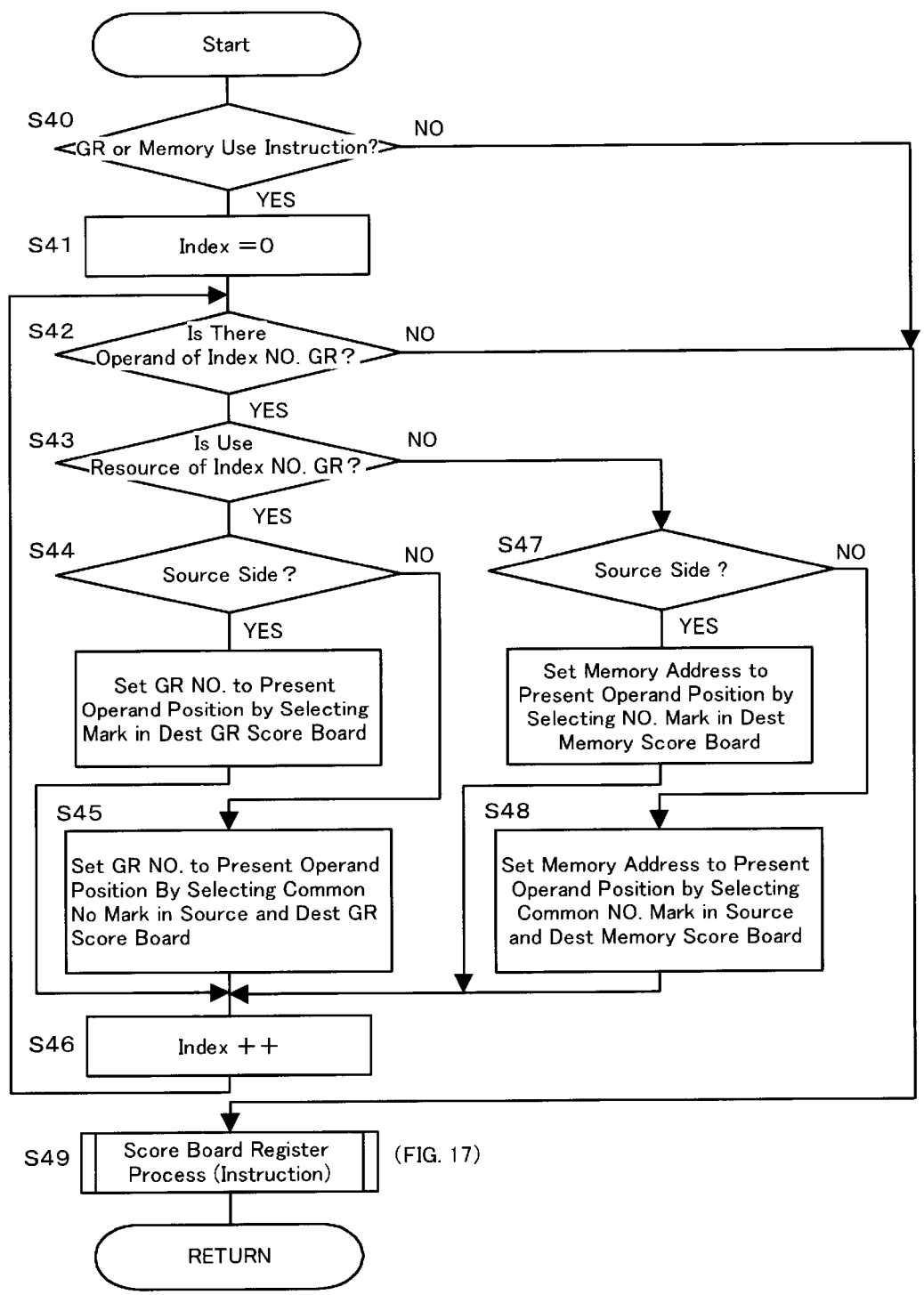
FIG. 16 is a flowchart of the no-resource interference process in FIG. 12.
Figure 17:
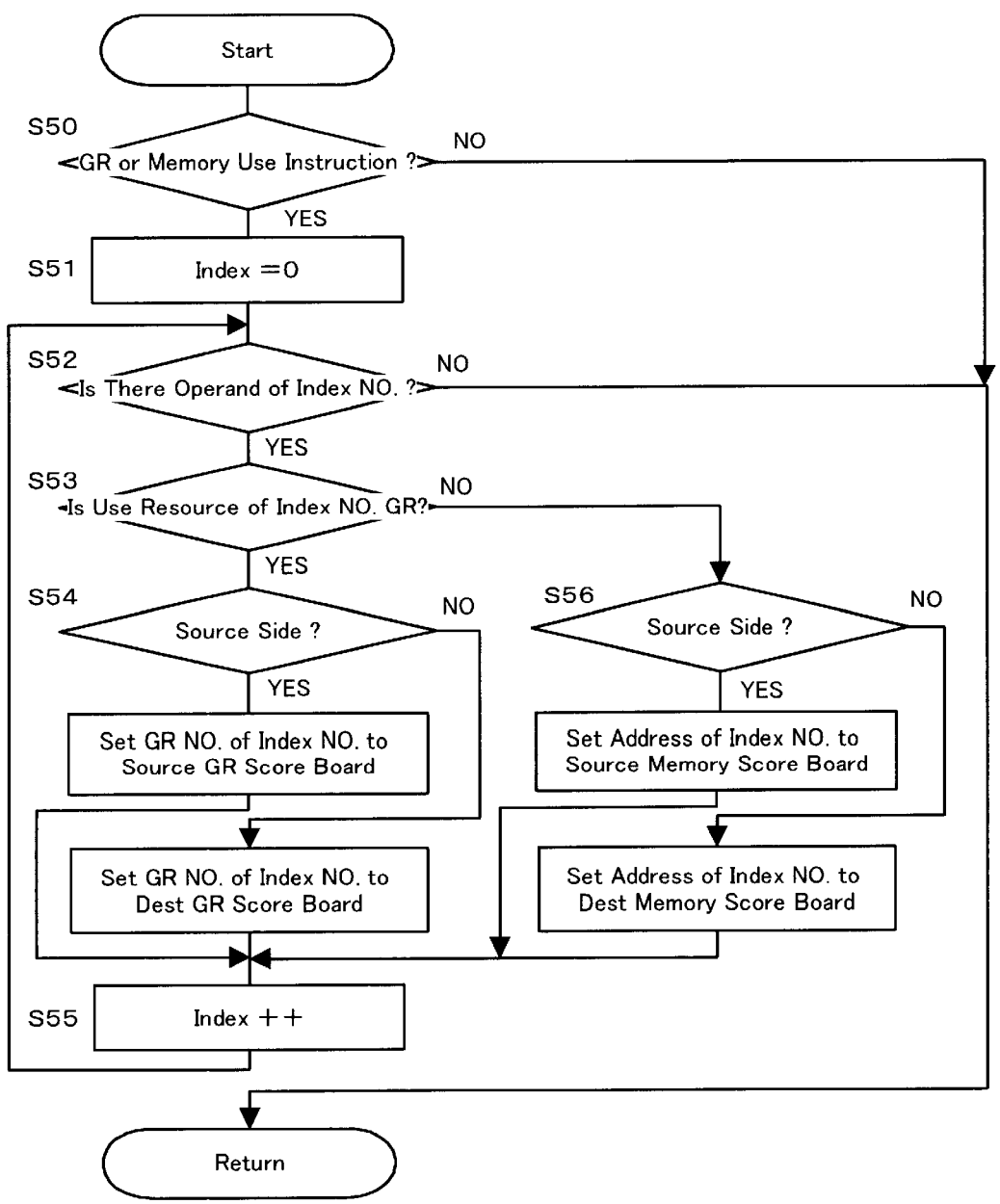
FIG. 17 is a flowchart of the scoreboard registration process in FIG. 15.

First, the GR/memory interference process will be explained using FIG. 10 thru FIG. 17. FIG. 10 is a flowchart of the GR/memory interference process, FIG. 11 is a flowchart of the leading/subsequent instruction generation process, FIG. 12 is a flowchart of the delay instruction generation process, FIG. 13 is a flowchart of the PIPE sweep process, FIG. 14 is a flowchart of the instruction storage process, FIG. 15 is a flowchart of the resource interference process in FIG. 11, FIG. 16 is a flowchart of the no-resource-interference process in FIG. 12, and FIG. 17 is a flowchart of the scoreboard registration process in FIG. 15.

The process will be explained using the GR/memory interference process in FIG. 10.

(S1) First, the number of stages and the maximum number of instructions is set, and the number of generated instructions, which is a pointer, is initialized to '0'.

(S2) Next, the number of pipeline sections is initialized to '0'.

(S3) Next, the leading/subsequent instruction generation process (see FIG. 11) is called up. As will be described below, here two instructions, a leading instruction and a subsequent instruction, are selected such that they will cause resource interference. At this time, the two instructions are selected such that the type of resource specified by the DEST operand of the leading instruction matches the resource type specified by the SOURCE operand of the subsequent instruction. In order to actually cause resource interference, the resource interference process (see FIG. 15), which resets the operand, is called up.

Here, first, the resources of the leading instruction are set in each scoreboard by the scoreboard registration process (see FIG. 17). The operands of the instruction are looked at one at a time to determine whether they are a GR/memory resource or a SOURCE/DEST resource, and then set in the specified scoreboard. Next, returning to FIG. 15, the currently registered DEST resource type of the leading instruction is determined whether it is GR or memory, and when it is GR, the DEST-direction GR scoreboard is checked, and when it is memory, the DEST-direction memory scoreboard is checked, and the resource that is marked in that scoreboard is fetched and set as the SOURCE operand for the subsequent instruction.

In this way, the DEST resource of the leading instruction is accessed as the SOURCE resource of the subsequent instruction, and it is possible to set the state of resource interference. Finally, the scoreboard registration process is called again, and the resource of the subsequent resource is set in the scoreboards. This is so that later, when setting the operands of the delay instruction, there is no interference with the resource of either the leading or subsequent instructions. Setting of the two interfering instructions and the scoreboards is now finished. Explanation of the GR/memory interference process in FIG. 10 is now continued.

(S4) Next, the value [The number of instructions+2+the number of sections+the number of stages] is checked whether it is greater than the maximum set number of instructions. When it exceeds the maximum value, this process ends.

(S5) When it does not exceed the maximum value, the number of sections is checked whether it exceeds the value [number of stages−1]. When it does not exceed the value, the process returns to step S2.

(S6) When it exceeds the value, the two instructions are shifted and an interlock-verification instruction string is generated. First, the delay-instruction generation process (see FIG. 12) is called. This process has a value as an index that is increased by '1' each time from '0' to [the number of pipeline stages−1]. The number of delay instructions generated here is equal to this value. This is performed by the no-resource-interference process (see FIG. 16).

This delay instruction uses the scoreboards to control resource interference without causing extra interference between the two instructions or between the delay instructions First, the instruction operands are checked one at a time, to determine where they are GR/memory or SOURCE/DEST operands.

In the case of a SOURCE operand, there is a possibility of RAW(Read After Write) or WAR(Write After Read) interference when using a resource that is used by a DEST operand, so unmarked resources in the DEST-direction scoreboard are set. In the case of a DEST operand, there is a possibility of resource interference when using either a SOURCE or DEST resource, so unmarked resources in either the SOURCE or DEST scoreboard are set.

To further avoid resource conflicts between delay instructions, the resources of the generated delay instruction are also registered in a scoreboard by the scoreboard registration process (see FIG. 17). In the delay-instruction generation process in FIG. 12, the process is repeated and executed to generate delay instruction up to a number equal to the value of the given index.

(S7) Next, returning to the GR/memory interference process in FIG. 10, the PIPE sweep process (see FIG. 13) is executed. This generates a number of random instructions equal to [The number of pipeline stages−1], and they are executed after one verification instruction string which comprises the two interfering instructions and the delay instructions. By executing this instruction, the current verification instruction string is removed from the pipeline without affecting the next instruction.

(S8) Next, returning to FIG. 10, the instruction storage process (see FIG. 14) is executed. Here, the instruction string generated by the above process is stored in memory, and a series of test-instructions strings are created. First, of the two interfering instructions, the leading instruction is stored in the position of the current instruction-string-storage pointer. Next, delay instructions equal to the number of the index given are stored after that. Next, the subsequent instruction is stored.

Finally, in order to remove the test instruction from the pipeline, sweep instructions equal to the [number of pipeline stages−1] are stored.

(S9) Returning to FIG. 10, the number of instructions is updated to [2+the number of sections+the number of stages −1], and '1' is added to the number of sections, then the process returns to step S4.

From generating instructions in step S3 to storing the instructions in step S8 is repeated while checking whether or not the instructions have shifted to [the number of pipeline stages of the instruction−1], in step S5. When the instructions have finished shifting, the process returns to step S2 to generate two new interfering instructions and to repeat the similar process. Step S4 repeats this process until reaching the specified maximum number of instructions, to create a series of pipeline test instruction strings.

Next, the leading/subsequent instruction generation process in FIG. 10 will be explained using FIG. 11.

(S11) Here, the two instructions, leading and subsequent instructions, that will cause resource interference are selected. At this time, two instructions are selected such that the resource type specified by the DEST operand of the leading instruction matches the resource type specified by the SOURCE operand of the subsequent instruction. In other words, a randomly generated instruction is set as the leading instruction. Next, it is determined whether this leading instruction uses a GR or memory resource. When the leading instruction that is set does not use either a GR or memory resource, the process is repeated to set a different random instruction as the leading instruction.

(S12) Next, a randomly generated instruction is set as the subsequent instruction. Then the type of the SOURCE resource of this subsequent instruction is checked whether it is the same type as the DEST resource of the leading instruction. When it isn't the same, the process is repeated to set a different random instruction as the subsequent instruction.

(S13) Next, as described above, there source interference process (see FIG. 15) is called for resetting the operand for causing resource interference. Here, first the resources of the leading instruction are set in the scoreboards by the scoreboard registration process (see FIG. 17). The operands of the instruction are looked at one at a time to check whether they are GR/memory or SOURCE/DEST operands, and then they are set in the specified scoreboard. Next, returning to FIG. 15, the type of the currently registered DEST resource for the leading instruction is checked whether it is GR/memory, and in the case it is GR, the DEST-direction GR scoreboard is checked, and in the case it is memory, the DEST-destination memory scoreboard is checked, and the marked resources are fetched and set as the SOURCE operands for the subsequent instruction.

In this way, the DEST resource of the leading instruction is accessed as the SOURCE resource of the subsequent instruction, and it is possible to set the state of resource interference. Finally, the scoreboard registration process is called again, and the resource of the subsequent resource is set in the scoreboards. This is so that later, when setting the operands of the delay instruction, there is no interference with the resource of either the leading or subsequent instructions. Setting of the two interfering instructions and the scoreboards is now finished. Explanation of the GR/memory interference process in FIG. 10 is now continued.

Next, the delay-instruction generation process in FIG. 10 is explained using FIG. 12.

(S15) First, the number of delays is set, and all of the delay instructions are initialized to '0'. Then, the index is initialized to '0'. This index is increased by '1' from '0' to [the number of pipeline stages–1], and the number of delay instructions generated is equal to this value.

(S16) The index is checked whether it is less than the set number [the number of pipeline stages–1]. When it is not less, the process ends as described above.

(S17) When it is less, the randomly generated instruction is set as the delay instruction for that index number. Next, the resource-interference process (see FIG. 16) is called. This delay instruction uses the scoreboards to control resource interference without causing extra interference between the two interfering instructions or between the delay instructions. First, the instruction operands are checked one at a time to determine where they are GR/memory or SOURCE/DEST operands. In the case of a SOURCE operand, there is a possibility of RAW or WAR interference when using a resource that is used by a DEST operand, so unmarked resources in the DEST-direction scoreboard are set. In the case of a DEST operand, there is a possibility of resource interference when using either a SOURCE or DEST resource, so unmarked resources in either the SOURCE or DEST scoreboard are set. To further avoid resource conflicts between delay instructions, the resources of the generated delay instructions are also registered in a scoreboard by the scoreboard registration process (see FIG. 17). Also, the index is increased by '1', and the process returns to step S16.

In the delay-instruction generation process in FIG. 12, this process (step S17) is repeatedly executed up to the number of times equal to the given index value, to create delay instructions.

Next, the PIPE sweep process in FIG. 10, is explained using FIG. 13.

(S18) First, the number of sections to sweep is set, and all of the sweep instructions are initialized to '0'. Next, the index is initialized to '0'. This index is increased by adding '1' from '0' to the set number [the number of pipeline stages–1], and the number of sweep instructions created equals this value.

(S19) The index is checked whether it is less than the set number [the number of pipeline stages–1]. When the index is not less, the process ends as described above.

When the index is less, the randomly generated instruction is set as the sweep instruction for that index number. Also, the index is increased by '1', and the process returns to step S19.

In the sweep process in FIG. 13, this process (step 19) is repeatedly executed up to the number of times equal to the given index, and sweep instructions are created.

Next, the instruction-storage process in FIG. 10 will be explained using FIG. 14. This instruction-storage process stores the instruction strings created in the processes shown in FIG. 11 thru FIG. 13 in the memory, and creates a series of test instruction strings. First, of the two interfering instructions, the leading instruction is stored in the position for the current instruction-string-storage pointer. Next, delay instructions, equal to the value of index, are stored. Then, of the two interfering instructions, the subsequent instruction is stored next. Finally, a number of sweep instructions equal to the value [the number of pipeline stages–1] are stored in order to remove the test instruction from the pipeline.

(S21) First, the number of instructions, the number of sections and the number of stages are set. Then, a value equal to [1 instruction length×the number of instructions] is set for the pace (indicates the area). The leading instruction is stored at the pace address. The value of '1 instruction length' is added to the pace. The index is initialized to '0'. This index is increased by adding '1' from '0' to the set number of sections or [the number of pipeline stages –], and the number of delay/sweep instructions equal to this value are stored.

(S22) The index is checked whether it is less than the number of sections. When the index is not less (greater), the process advances to step S24.

(S23) When the index is less, then the delay instruction for that index value is stored in the pace address. The value of '1 instruction length' is added to the pace, the index is increased by '1' and the process returns to step S22.

(S24) Next, of the two interfering instructions, the leading instruction is stored in the position of the current instruction-string-storage pointer, then a number of delay instructions, equal to value of the index, are stored, and then the subsequent instruction is stored. In other words, the subsequent instruction is stored in the pace address. The value of '1 instruction length' is added to the pace, and the index is increased by '1'.

(S25) The index is checked whether it is less then [the number of stages–1]. When the index is not less (greater), this process ends.

(S26) When the index is less, the sweep instruction for that index number is stored in the pace address. The value of '1 instruction length' is added to the pace, the index is increased by '1' and the process returns to step S25.

In this way, the number of sweep instructions equal to the value [the number of pipeline stages–1] are stored for removing the test instructions for the pipeline.

Next, the resource-interference process in FIG. 11 will be explained using FIG. 15.

(S30) All of the scoreboards 50 to 53 (see FIG. 4) are initialized to '0'.

(S31) Next, the scoreboard registration process (see FIG. 17) is called, and the resources of the leading instruction are set on the scoreboards. The instruction operands are checked one at a time whether the operands are GR/memory or SOURCE/DEST operands, and then are set in the specified scoreboards.

(S32) Then, the type of the currently registered DEST resources of the leading instruction is checked whether it is GR or memory.

(S33) When the type is GR, the DEST-direction GR scoreboard 51 is checked, and the marked resources are fetched and set as the SOURCE operands of the subsequent instruction.

(S34) When the type is memory, the DEST-direction memory scoreboard 53 is checked, and the marked resources are fetched and set as the SOURCE operands of the subsequent instruction. In this way, the DEST resources of the leading instruction are accessed as SOURCE resources of the subsequent instruction, and it is possible to set a resource interference state.

(S35) Finally, the scoreboard registration process (see FIG. 17) is called again, and the resources of the subsequent instruction are also set in the scoreboards. This is so that later when setting the operands of the delay instructions, there is no interference with the resources of either the leading instruction or subsequent instruction. Setting of the two interfering instructions and scoreboards is now finished, so processing returns to the GR/memory interference process in FIG. 10.

Next, the no-resource-interference process in FIG. 12 will be explained using FIG. 16. This process uses the scoreboards to generate delay instructions that will not cause extra interference with the two interfering instructions or between delay instructions.

(S40) First, the instruction operands are checked one at a time to determine whether the instructions use GR/memory resources. When an instruction does not use GR/memory resources, the process advances to the scoreboard registration process (see FIG. 17) of step S49.

(S41) When an instruction uses GR/memory resources, the index is initialized to '0'.

(S42) The instruction is checked whether there is an operand for the index number, and when there isn't, the process advances to the scoreboard registration process (see FIG. 17) of step S49.

(S43) When there is an operand for the index number, the resource used by the operand of the index number is checked whether it is a GR resource. When the resource is not a GR resource, the process advances to step S47.

(S44) When the resource used by the operand of the index number, is a GR resource, the operand of the index number is checked whether it is on the SOURCE side. When the operand is a SOURCE operand, there is a possibility that RAW or WAR interference could occur when a resource used by a DEST operand is used, so a GR number is randomly selected from an unmarked resource in the DEST-direction scoreboard, and set in the current operand location.

(S45) When the operand is not a SOURCE operand but is a DEST operand, there is a possibility that resource interference will occur when using either a SOURCE or DEST resource, so a GR number is randomly selected from an unmarked resource from either the SOURCE-/DEST-direction scoreboard, and set in the current operand position.

(S46) The index is increased by '1', and the process returns to step S42.

(S47) When the resource used by the operand of the index number is not a GR resource, or in other words, when the resource is a memory resource, similarly, the operand of the index number is checked whether it is a SOURCE operand. When it is a SOURCE operand, there is a possibility of RAW or WAR interference occurring when using a resource being used by a DEST operand, so a memory address is selected randomly from the unmarked resources in the DEST-direction scoreboard, and set in the current operand position.

(S48) When the operand is a DEST operand and not a SOURCE operand, there is a possibility of RAW or WAR interference occurring when using a resource being used by a either a SOURCE or DEST operand, so a memory address is selected randomly from the unmarked resources in the either the SOURCE-/DEST-direction scoreboards, and set in the current operand position. The process then advances to step S46.

(S49) Next, in order to avoid resource conflicts between delay instructions, the resources for the generated delays are also registered in a scoreboard by the scoreboard-registration process (see FIG. 17).

Next, the scoreboard registration process in FIG. 15 and FIG. 16 will be explained using FIG. 17. This process, in order to set the instruction resources in the scoreboards, checks the instruction operands one at a time to determine whether they are GR/memory or SOURCE/DEST operands, and sets them in the specified scoreboard.

(S50) First, the instruction operands are checked one at a time to determine whether the instruction uses GR/memory resources. When the instruction does not use GR/memory resources, the process returns.

(S51) When the instruction uses GR/memory resources, the index is initialized to '0'.

(S52) The instruction is checked whether there is an operand of the current index number, and when there isn't, the process returns.

(S53) When there is an operand of the current index number, the resource used by the operand of the index number is checked whether it is a GR resource. When the resource is not a GR resource, the process advances to step S56.

(S54) When the resource used by the operand of the index number is a GR resource, the operand of the index number is checked whether it is a SOURCE operand. When the operand is a SOURCE operand, the GR number of the index number is set in the SOURCE scoreboard 50. When the operand is a DEST operand and not a SOURCE operand, the GR number of that index number is set in the DEST scoreboard 51.

(S55) The index is increased by '1' and the process returns to step S52.

(S56) When the resource used by the operand of that index number is not a GR resource, in other words, when the resource is a memory resource, similarly, the operand of that index number is checked whether the operand is a SOURCE operand. When the operand is a SOURCE operand, the address of that index number is set in the SOURCE scoreboard 52. When the operand is a DEST operand and not a SOURCE operand, the address of that index number is set in the DEST scoreboard 53. The process then advances to step S55.

Figure 18:
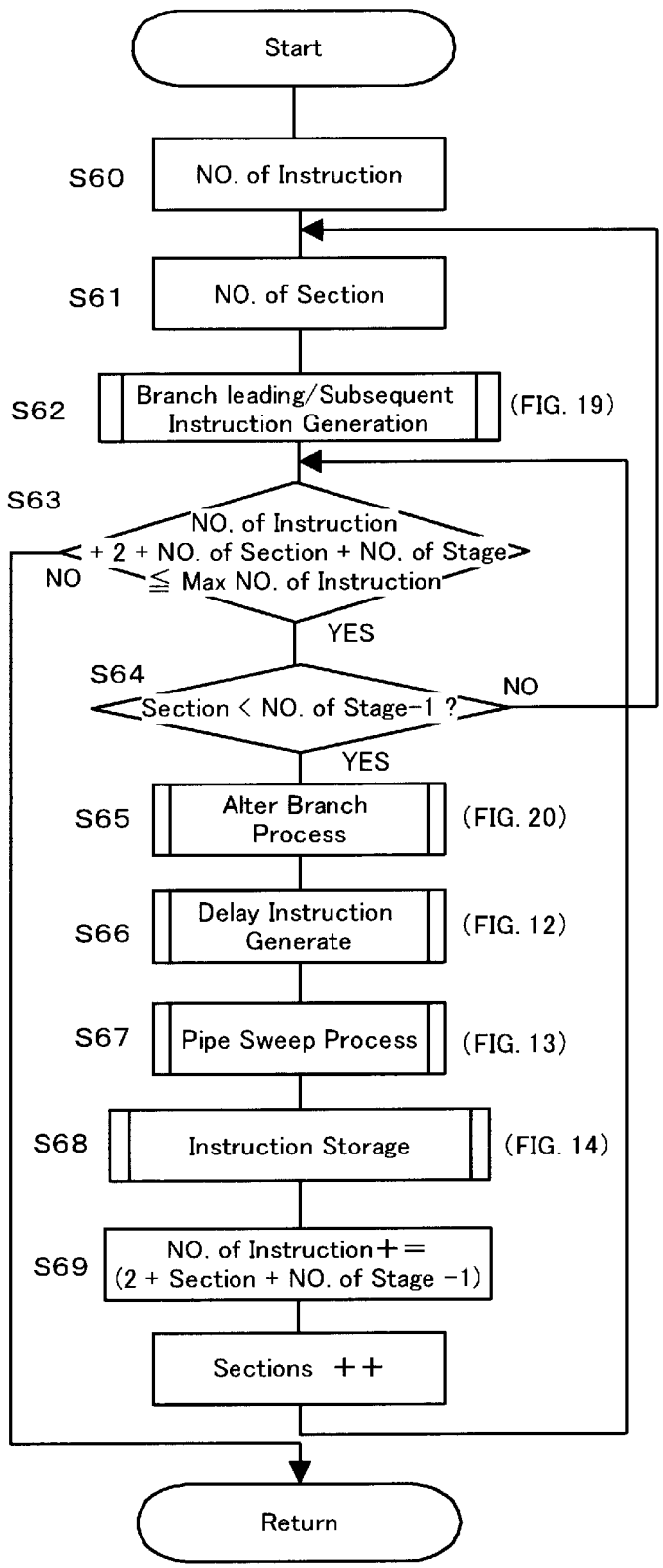
FIG. 18 is a flowchart of the PC interference process in FIG. 5.
Figure 19:
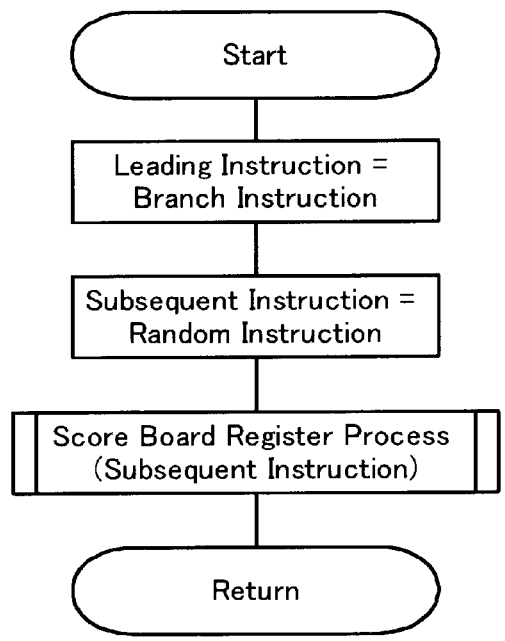
FIG. 19 is a flowchart of the branch leading/subsequent instruction generation process in FIG 19.
Figure 20:
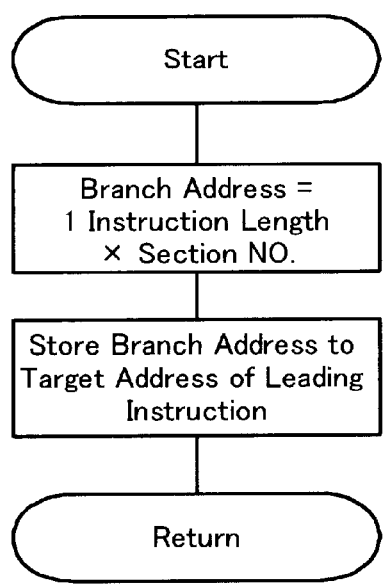
FIG. 20 is a flowchart of the branch destination change process in FIG. 19.
Figure 21:
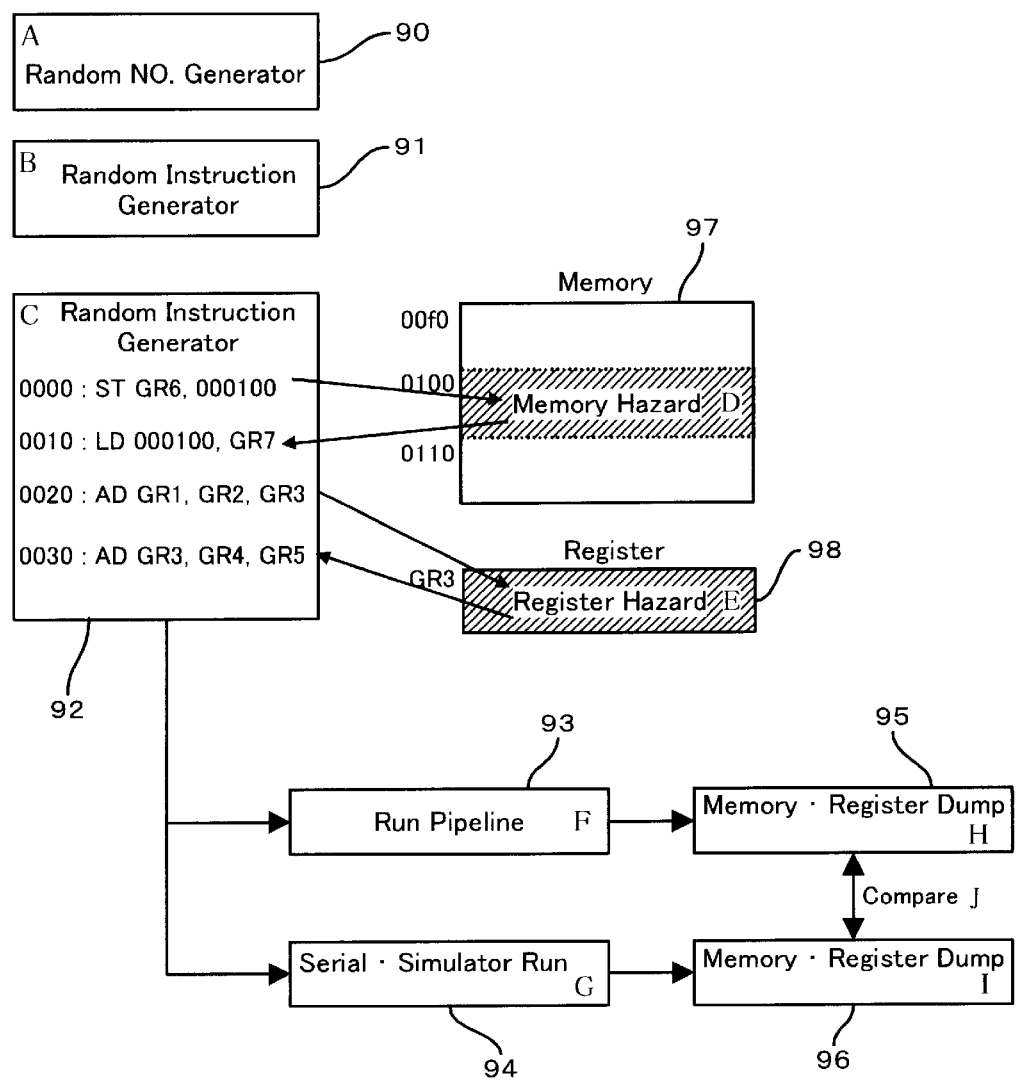
FIG. 21 is a drawing explaining the pipeline test method of the prior art.

Next, the PC interference process will be explained using FIG. 18 to FIG. 20. First, the PC interference process in FIG. 18 is similar to the GR/memory interference process in FIG. 10. The process differs in that there is a branch leading/subsequent instruction generation process (see FIG. 19) for setting the interfering leading and subsequent instructions, and a branch-destination change process (see FIG. 20) for updating the branch-destination address of the branch instruction each time.

(S60) First, the number of stages, and the maximum number of instructions are set, and the number of instructions generated, which is a pointer, is initialized to '0'.

(S61) Next, the number of pipeline sections is initialized to '0'.

(S62) Then, the branch leading/subsequent instruction generation process (see FIG. 19) is called. As shown in FIG. 19, the branch leading/subsequent instruction generation process generates the interfering leading instruction and subsequent instruction. In the case of PC interference, the leading instruction is always a branch instruction, so a branch instruction is definitely set for the leading instruction. The subsequent instruction is a randomly set instruction. In order to avoid interference with the delay instructions that are generated later, the resources are registered in the scoreboards for the subsequent instruction.

(S63) Next, the value [the number of instructions+2+the number of sections +the number of stages] is checked whether it exceeds the maximum number of instructions that was set. When the value exceeds the maximum number, this process ends.

(S64) When the value does not exceed the maximum number, the number of sections is checked whether it exceeds the value [the number of stages−1]. When the number of sections does not exceed this value, the process returns to step S61.

(S65) When the number of sections exceeds the value, the branch-destination change process (see FIG. 20) is called. As shown in FIG. 20, here, the address of the branch destination of the leading branch instruction is increased the amount of the number of delay instructions, such that it always branches to the first generated subsequent instruction.

(S66) Then, an interlock-verification instruction string is created while shifting the two instructions. First, the delay instruction generation process (see FIG. 12) is called. This process is the same as that described using FIG. 12, and the process in FIG. 12 is repeatedly executed up to the number of times of the given index value, to create delay instructions.

(S67) Next, the PIPE sweep process (see FIG. 13) is executed. As explained for FIG. 13, this generates random instructions up to a number equal to the value [the number of pipeline stages−1], and is executed after one verification instruction string that comprises (two interfering instructions+delay instructions).

(S68) Then, the instruction-storage process (see FIG. 14) is executed. As describe above, here, the instruction strings generated by the aforementioned process is stored in the memory, to create a series of test instruction strings. First, of the two interfering instruction, the leading instruction is stored in the position of the current instruction-string-storage pointer. Next, a number of delay instructions equal to the number of the given index are stored. Then, the subsequent instruction is stored. Finally, the sweep instructions equal to the value [the number of pipeline stages−1] are stored in order to remove the test instructions from the pipeline.

(S69) The number of instructions is updated to [2+the number of sections+the number of stages−1], the number of sections is increased by '1', and the process returns to step S63.

In step S64, the process from the generation of instructions in step S62 to the step of storing the instructions in step S68 are repeated while checking the instructions whether they have finished shifting up to [the number of pipeline stages for the instruction−1]. When the instructions have finished shifting, the process returns to step S62 to create two new instructions for PC interference and a similar process is repeated. In step S63, these processes are repeated until the specified maximum number of instructions is reached, to create a series of pipeline test instruction strings for a PC hazard.

As described above, the random-instruction generation process 31 in FIG. 1 and FIG. 3 generates a test-instruction string for causing a GR or memory hazard and a PC hazard. This test instruction string is stored in memory and executed by the CPU1. In the embodiment described above, a test-instruction string is generated for causing a GR or memory hazard and a PC hazard, however, a test-instruction string for causing just one GR, memory or PC hazard can be generated, and appropriately selected for the verification process.

The preferred embodiments of the present invention have been explained, however the invention is not limited to these embodiments and can be embodied in various forms within the scope of the present invention.

This Invention has the Following Effects (1) Randomly generated instructions are analyzed, and in order to generate instructions that will cause a state of interference, a table is used notifying the subsequent instruction of the status of resource usage by the leading instruction, and by generating resources used by the subsequent instruction according to the status if resource usage in the table, it is possible to automatically generate a subsequent instruction that will interfere with the leading instruction.

(2) Therefore, a subsequent instruction can be generated that will interfere with the leading instruction without having to enter interference conditions.

(3) Moreover, an instruction string with interference can be generated for all instruction types, even when there are many instruction types.

(4) Furthermore, instructions are generated by analyzing actual conditions and not according to time data, so instructions that cause a state of interference can be generated even when the time required at each stage of the pipeline is short. This simplifies comprehensive verification of the pipeline, so it is possible to remarkably improve the verification coverage for a set time, and to effectively reduce the occurrence of interlock trouble after chip manufacture. Since most trouble after chip manufacture can be considered not to be interlock trouble, by applying this invention it is possible to greatly reduce the cost for chip revision.

What is claimed is:

1. A pipeline testing method of testing a pipeline mechanism of a processor comprising:

a generation operation of generating a test instruction string for said pipeline;

an operation of executing the generated said instruction string by said processor; and an operation of verifying said pipeline mechanism of said processor according to said execution results, wherein said generation operation comprises:

an operation of generating a leading instruction and subsequent instruction;

an operation of analyzing said leading instruction and setting a resource that said leading instruction uses in a setting table before said executing operation; and an operation of setting a resource that said subsequent instruction uses according to said set resource, and generating a subsequent instruction that interferes with the resources used by said leading instruction before said executing operation.

2. The pipeline testing method of claim 1, wherein said generating operation comprises an operation of generating said leading instruction and said subsequent instruction by a pseudo random generation.

3. A pipeline testing method of testing a pipeline mechanism of a processor comprising:
- a generation operation of generating a test instruction string for said pipeline;
- an operation of executing the generated said instruction string by said processor; and
- an operation of verifying said pipeline mechanism of said processor according to said execution results; wherein said generation operation comprises:
    - an operation of generating a leading instruction and subsequent instruction;
    - an operation of analyzing said leading instruction and setting a resource that said leading instruction uses in a setting table; and
    - an operation of setting a resource that said subsequent instruction uses according to said set resource, and generating a subsequent instruction that interferes with the resources used by said leading instruction, wherein
        - said generation operation further comprises:
            - an operation of inserting an instruction, between said leading instruction and said subsequent instruction, that does not interfere with said resource.

4. The pipeline testing method of claim 3, wherein said generation operation further comprises:
- an operation of generating said instruction, that does not interfere with said resource by referring said resources of said leading instruction and said subsequent instruction in said table.

5. The pipeline testing method of claim 3, wherein said generation operation further comprises:
- an operation of generating a plural instruction set comprising said instruction, that does not interfere with said resource, said leading instruction and said subsequent instruction, each set has the different number of said inserted instruction.

6. A pipeline testing method of testing a pipeline mechanism of a processor comprising:
- a generation operation of generating a test instruction string for said pipeline;
- an operation of executing the generated said instruction string by said processor and
- an operation of verifying said pipeline mechanism of said processor according to said execution results; wherein said generation operation comprises:
    - an operation of generating a leading instruction and subsequent instruction;
    - an operation of analyzing said leading instruction and setting a resource that said leading instruction uses in a setting tablel; and
    - an operation of setting a resource that said subsequent instruction uses according to said set resource, and generating a subsequent instruction that interferes with resources used by said leading instruction,
- further comprising:
    - an operation of setting a pipeline active mode or non-active mode to said processor;
    - and wherein said executing operation comprises:
        - an operation of executing the generated said instruction string by said pipeline mechanism of said processor in said pipeline active mode; and
        - an operation of executing the generated said instruction string by said processor without using said pipeline mechanism in said pipeline non-active mode.

7. A pipeline-testing-instruction-string generation method to generate a test-instruction string to test a pipeline mechanism of a processor, comprising:
- an operation of generating a leading instruction and subsequent instruction;
- an operation of analyzing said leading instruction and setting a resource that said leading instruction uses in a setting table before executing a generated test instruction string by said processor; and
- an operation of setting a resource that said subsequent instruction uses according to said set resource, and generating a subsequent instruction that interferes with the resources used by said leading instruction table before executing the generated test instruction string by said processor.

8. A pipeline-testing-instruction-string generation method to generate a test instruction string to test a pipeline mechanism of a processor, comprising:
- an operation of generating a leading instruction and subsequent instruction;
- an operation of analyzing said leading instruction and setting a resource that said leading instruction uses in a setting table; and
- an operation of setting a resource that said subsequent instruction uses according to said set resource, and generating a subsequent instruction that interferes with resources used by said leading instruction,
- further comprising:
    - an operation of inserting an instruction, between said leading instruction and said subsequent instruction, that does not interfere with the resources.

9. The pipeline-testing-instruction-string generation method of claim 8, wherein
said generation operation further comprises:
- an operation of generating said instruction, that does not interfere with said resource by referring said resources of said leading instruction and said subsequent instruction in said table.

10. The pipeline-testing-instruction-string generation method of claim 9, wherein
said generation operation further comprises:
- an operation of generating a plural instruction set comprising said instruction, that does not interfere with said resource, said leading instruction and said subsequent instruction, each set has the different number of said inserted instruction.

11. The pipeline-testing-instruction-string generation method of claim 8, wherein
said generating operation comprises an operation of generating said leading instruction and said subsequent instruction by a pseudo random generation.

12. A pipeline testing system to test a pipeline mechanism of a processor, comprising:
- a memory to store a test program; and
- said processor having said pipeline mechanism to process said test program in said memory,
- wherein said processor generates a test instruction string for said pipeline, executes the generated said instruction string, and verifies said pipeline mechanism according to said execution results;
- and wherein said processor generates a leading instruction and subsequent instruction, analyzes said leading instruction and sets a resource that said leading instruction uses in a setting table, and sets a resource that said subsequent instruction uses according to said set resource to generate a subsequent instruction that interferes with the resources used by said leading instruction, before executing a generated instruction string.

13. The pipeline testing system of claim 12, wherein said processor generates said leading instruction and said subsequent instruction by a pseudo random generation.

14. A pipeline testing system to test a pipeline mechanism of a processor, comprising:

a memory to store a test program; and said processor having said pipeline mechanism to process said test program in said memory, wherein said processor generates a test instruction string for said pipeline, executes the generated said instruction string, and verifies said pipeline mechanism according to execution results;

and wherein said processor generates a leading instruction and subsequent instruction, analyzes said leading instruction and sets a resource that said leading instruction uses in setting table, and sets a resource that said subsequent instruction uses according to said set resource to generate a subsequent instruction that interferes with resources used by said leading instruction, and wherein said processor inserts an instruction, between said leading instruction and said subsequent instruction, that does not interfere with said resource.

15. The pipeline testing system of claim 14, wherein said processor generates said instruction that does not interfere with said resource by referring said resources of said leading instruction and said subsequent instruction in said table.

16. The pipeline testing system of claim 14, wherein said processor generates a plural instruction set comprising said instruction that does not interfere with said resource, said leading instruction and said subsequent instruction, each set has the different number of said inserted instruction .

17. A pipeline testing system to test a pipeline mechanism of a processor, comprising:

a memory to store a test program; and said processor having said pipeline mechanism to process said test program in said memory, wherein said processor generates a test instruction string for said pipeline, executes the generated said instruction string, and verifies said pipeline mechanism according to execution results;

and wherein said processor generates a leading instruction and subsequent instruction, analyzes said leading instruction and sets a resource that said leading instruction and sets a resource that said leading instruction uses in a setting tale and sets a resource that said subsequent instruction uses according to said set resource to generate a subsequent instruction that interferes with resources used by said leading instruction, and wherein said processor executes the generated said instruction string by said pipeline mechanism of said processor in a pipeline active mode, and executes the generated said instruction string by said processor without using said pipeline mechanism in a pipeline non-active mode.

18. A program storage medium to store a program which generates a test-instruction string to test a pipeline mechanism of a processor, wherein said program comprises:

a program to generate a leading instruction and subsequent instruction;

a program to analyze said leading instruction and to set a resource that said leading instruction uses in a setting table;

a program to set a resource that said subsequent instruction uses according to said set resource, and to generate a subsequent instruction that interferes with the resources used by said leading instruction; and a program to insert an instruction, between said leading instruction and said subsequent instruction, that does not interfere with said resource.

* * * * *

UNITED STATES PATENT AND TRADEMARK OFFICE
CERTIFICATE OF CORRECTION

PATENT NO. : 6,732,297 B2  Page 1 of 1
APPLICATION NO. : 09/725881
DATED : May 4, 2004
INVENTOR(S) : Hironobu Oura It is certified that error appears in the above-identified patent and that said Letters Patent is hereby corrected as shown below:

On the title page, (54) Title, line 4, change "METHOD" to --MEDIUM--.

On the title page (57) Abstract, line 8, delete ",".

Col. 1, line 4 (4th line of the title), change "METHOD" to --MEDIUM--.

Col. 21, lines 25-26, delete the paragraph break.

Signed and Sealed this

Twenty-fifth Day of December, 2007

JON W. DUDAS
*Director of the United States Patent and Trademark Office*